(12) United States Patent
Yamaguchi et al.

(10) Patent No.: US 7,867,649 B2
(45) Date of Patent: *Jan. 11, 2011

(54) NON-AQUEOUS ELECTROLYTE SECONDARY CELL

(75) Inventors: Akira Yamaguchi, Fukushima (JP); Atsuo Omaru, Fukushima (JP); Masayuki Nagamine, Fukushima (JP)

(73) Assignee: Sony Corporation, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 11/446,332

(22) Filed: Jun. 2, 2006

(65) Prior Publication Data

US 2006/0222936 A1  Oct. 5, 2006

Related U.S. Application Data

(62) Division of application No. 10/126,793, filed on Apr. 19, 2002, now Pat. No. 7,138,207.

(30) Foreign Application Priority Data

Apr. 20, 2001  (JP) ............................. P2001-123534
Jun. 5, 2001   (JP) ............................. P2001-169884

(51) Int. Cl.
   *H01M 2/14* (2006.01)
   *H01M 2/16* (2006.01)
(52) U.S. Cl. ..................... 429/144; 429/145; 429/254
(58) Field of Classification Search ................. None
   See application file for complete search history.

(56) References Cited

U.S. PATENT DOCUMENTS

| 4,650,730 A | 3/1987 | Lundquist et al. |
| 4,863,792 A | 9/1989 | Mrozinski |
| 5,565,281 A | 10/1996 | Yu et al. |
| 5,856,039 A | 1/1999 | Takahashi |
| 5,993,954 A * | 11/1999 | Radovanovic et al. ..... 428/315.5 |
| 6,544,682 B1 | 4/2003 | Takami et al. |
| 2002/0114993 A1 | 8/2002 | Iyaki et al. |
| 2003/0118896 A1 | 6/2003 | Yamaguchi et al. |

FOREIGN PATENT DOCUMENTS

| EP | 0 201 875 | 11/1986 |
| EP | 0 682 376 | 11/1995 |
| EP | 0 715 364 | 6/1996 |
| EP | 823740 | * 2/1998 |
| EP | 1 022 798 | 7/2000 |
| JP | 06020671 | 1/1994 |
| JP | 10074502 | 3/1998 |
| WO | WO 98/49225 | 11/1998 |

OTHER PUBLICATIONS

Machine translation of JP 10-074502, Mar. 1998.*
Machine translation of JP 06-020671, Jan. 1994.*

* cited by examiner

*Primary Examiner*—Jonathan Crepeau
(74) *Attorney, Agent, or Firm*—SNR Denton US LLP

(57) ABSTRACT

A non-aqueous electrolyte secondary cell which achieves satisfactory low temperature characteristics and high safety against overcharging in combination. The cell includes a lithium-containing cathode, an anode capable of doping and undoping lithium, a non-aqueous electrolyte and a separator. The separator is made up by a plurality of layers of a porous material or materials presenting micro-sized pores. The layers of the porous material or materials is formed of microporous separator materials representing different combinations of the porosity, melting point or material/compositions.

7 Claims, 2 Drawing Sheets

NON-AQUEOUS ELECTROLYTE SECONDARY CELL

RELATED APPLICATION DATA

The present application claims priority to application Ser. No. 10/126,793, filed Apr. 19, 2002 now U.S. Pat. No. 7,138,207, which claims priority to Japanese Application(s) No(s). P2001-123534 filed Apr. 20, 2001, and P2001-169884 filed Jun. 5, 2001, each of which is incorporated herein by reference in its entirety.

BACKGROUND OF THE INVENTION

1. Field of the Invention

This invention relates to a non-aqueous electrolyte secondary cell having a cathode, an anode, a non-aqueous electrolyte and a separator. More particularly, it relates to a non-aqueous electrolyte secondary cell in which a separator is of a multi-layer structure having two or more layers.

2. Description of Related Art

Recently, variegated portable electronic equipment, such as camera built-in type VTR (video tape recorder), portable telephone sets or lap top computers, have made their debut and, with remarkable progress in the electronic technology, small-sized lightweight versions of these electronic equipment have been realized one after another. As a portable power supply for these electronic equipment, researches and developments for improving the energy density of the cells, in particular the secondary cells, as portable power sources for these electronic equipment, are going on briskly.

Of these, lithium ion secondary cell, for example, is thought to be promising because this cell is able to develop a higher energy density than that achievable with a nickel cadmium cell as a conventional aqueous electrolyte secondary cell. As the separator for the non-aqueous electrolyte secondary cell, such as lithium secondary cell, a polyolefin micro-porous film, as typified by high molecular polypropylene or high molecular polypropylene, is widely used.

It should be noted that, when the temperature of the non-aqueous electrolyte cell becomes higher than a preset temperature to reach a shutdown temperature, the polyolefin micro-porous film, used as a separator for the non-aqueous electrolyte cell, is fused to stop the numerous pores to obstruct lithium ion migration to forcibly halt the cell reaction, as a result of which the inner temperature of the cell is prevented from rising to maintain the safety of the non-aqueous electrolyte cell.

There are micro-irregularities of several μm in the surface of a plate of the lithium cell. Thus, if a polyolefin based porous film, liable to be torn, is built into the lithium cell as a separator for the cell, there is a risk that the film is damaged by the micro-irregularities on the plate surface to cause electrical shorting.

Although it has been proposed to use two sorts of porous films having different values of mechanical strength to improve the film strength, this approach cannot be said to give sufficient results.

It should be noted that, as the polyolefin micro-porous film, used in this non-aqueous electrolyte secondary cell, such a film having the average pore diameter on the order of 1 to 0.05 μm and a porosity on the order of 45%, is widely used, depending on the material used. With the non-aqueous electrolyte secondary cell, in which the separator has these micro-sized pores, lithium ions can be migrated across the cathode and the anode in charging/discharging the cell.

On the other hand, when the non-aqueous electrolyte secondary cell is overcharged such that the inner temperature of the cell is raised, this polyolefin micro-porous film exhibits a so-called shutdown effect in which the cell undergoes an endothermic reaction and is thereby melted, with the micro-sized pores being then closed to cause the current to cease to flow.

However, when the value of the porosity of the separator, comprised of a polyolefin micro-porous film, is high, there is a certain time lag until separator pores are completely blocked since the separation reaches the shutdown temperature. Thus, there is a possibility that inner temperature in the cell is further raised during this time interval, with the separator being melted and flowing out on reaching its meltdown temperature. In such case, there is a possibility of electrical shorting in the non-aqueous electrolyte secondary cell due to physical contact between the cathode and the anode.

So, the porosity of the separator is desirably set to a lower value. However, in this case, lithium ions are hardly movable across the cathode and the anode during charging/discharging of the non-aqueous electrolyte secondary cell, with the result that its low temperature characteristics are deteriorated.

Thus, there has as yet not been established a non-aqueous electrolyte secondary cell having optimum low temperature characteristics and high safety against over-charging.

On the other hand, if a micro-sized-pore polyolefin film having a low melting point is used as a separator, it is poor in physical strength against e.g., punching, piercing, thus raising the inferiority fraction in manufacturing the cells.

SUMMARY OF THE INVENTION

It is therefore an object of the present invention to provide a non-aqueous electrolyte secondary cell which has achieved both the optimum low temperature characteristics and high safety against over-charging simultaneously.

It is another object of the present invention to provide a non-aqueous electrolyte cell in which temperature rise at the time of an unusual cell operation is suppressed and which makes it possible to maintain optimum productivity.

In one aspect, the present invention provides a non-aqueous electrolyte secondary cell including a lithium-containing cathode active material, an anode active material capable of doping and undoping lithium, a non-aqueous electrolyte and a separator, wherein the separator includes a plurality of layers of a porous material or materials having micro-sized pores, and wherein the layers of the porous material or materials are formed of micro-porous separator materials representing different combinations of the porosity, melting point or material/compositions.

In another aspect, the present invention provides a non-aqueous electrolyte secondary cell including a band-shaped cathode, a band-shaped anode, a non-aqueous electrolyte and a separator, wherein the separator includes a plurality of layers of a porous material or materials having micro-sized pores, at least two layers of the porous material or materials having different porosity values, and wherein an average pore diameter of the micro-sized pores of the layer among the layers of different porosity values which has the highest porosity value is larger than an average pore diameter of the micro-sized pores of the layer among the layers of different porosity values which has the lowest porosity value.

With the porosity value of the layer with the lowest porosity value being A and with the porosity value of the layer with the highest porosity value being B, the ratio of the porosity value of the layer with the lowest porosity value to the porosity value of the layer with the highest porosity value, or A/B, preferably ranges between 44% and 93%.

The porosity A of the layer with the lowest porosity value preferably ranges between 20% and 40%.

The porosity B of the layer with the highest porosity value preferably ranges between 45% and 60%.

The thickness of the layer with the lowest porosity preferably ranges between 2% and 55% of the thickness of the separator.

The layer with the lowest porosity and the layer with the highest porosity may be of the same material.

The layer with the lowest porosity and the layer with the highest porosity may be of different materials.

At least one of the porous materials having micro-sized pores is preferably formed by coating a resin material followed by drying.

The porous material is preferably polyolefin.

The non-aqueous electrolyte secondary cell preferably includes a band-shaped cathode, a band-shaped anode, a non-aqueous electrolyte and a separator, wherein the separator includes a plurality of micro-porous films, wound together, and wherein the melting point of the micro-porous film proximate to the cathode is lower than that of the other micro-porous film or films.

The micro-porous film proximate to the cathode preferably has two or more melting points.

The thickness of the micro-porous film proximate to the cathode is preferably not less than 20% and not more than 85% of the total thickness of the separator.

The melting point of the micro-porous film proximate to the cathode is preferably not lower than 112° C. and not higher than 133° C.

The porosity of the separator is preferably not lower than 25% and not higher than 50%.

The melting point of the other one or ones of the micro-porous films is preferably not lower than 135° C.

The porous film is preferably formed of polyolefin.

The anode preferably contains a material that is able to dope and undope lithium.

The cathode preferably contains a material that is able to dope and undope lithium.

The non-aqueous electrolyte secondary cell of the present invention includes a lithium-containing cathode, an anode capable of doping and undoping lithium, a non-aqueous electrolyte and a separator, wherein the separator includes a plurality of layers of a porous material or materials presenting micro-sized pores. At least two of the layers of the porous materials are of different porosity values. The average pore diameter of the micro-sized pores of the layer among the layers of the porous materials which has the highest porosity is set so as to be larger than that of the layer which has the lowest porosity.

In the non-aqueous electrolyte secondary cell of the present invention, as described above, in which the average pore diameter of the micro-sized pores of the layer having the highest porosity is of a larger value, the ionic conductivity across the cathode and the anode in charging/discharging may be optimized, thus improving low temperature characteristics. Moreover, the average pore diameter of the micro-sized pores of the layer having the lowest porosity is of a smaller value, the micro-sized pores are not stopped up in a short time even when the inner temperature in the non-aqueous electrolyte secondary cell is raised due to overcharging, thus assuring superior shutdown effects and high safety against overcharging.

Thus, with the non-aqueous electrolyte secondary cell of the present invention, both the optimum low temperature characteristics and high safety against overcharging may be achieved in combination.

Also, with the non-aqueous electrolyte secondary cell of the present invention, the micro-porous film among the plural micro-porous films of the separator which is proximate to the cathode has a lower melting point. Thus, the micro-porous film proximate to the cathode promptly absorbs the heat generated in the cathode in case of an unusual cell operation to suppress temperature rise in the cell. On the other hand, the micro-porous film or films other than the micro-porous film proximate to the cathode is of a higher melting point and hence has a high physical strength. Consequently, with the non-aqueous electrolyte secondary cell of the present invention, temperature rise in case of the unusual cell operation may be suppressed to assure high safety against overcharging, while high productivity is assured.

DESCRIPTION OF THE PREFERRED EMBODIMENTS

Figure 1:
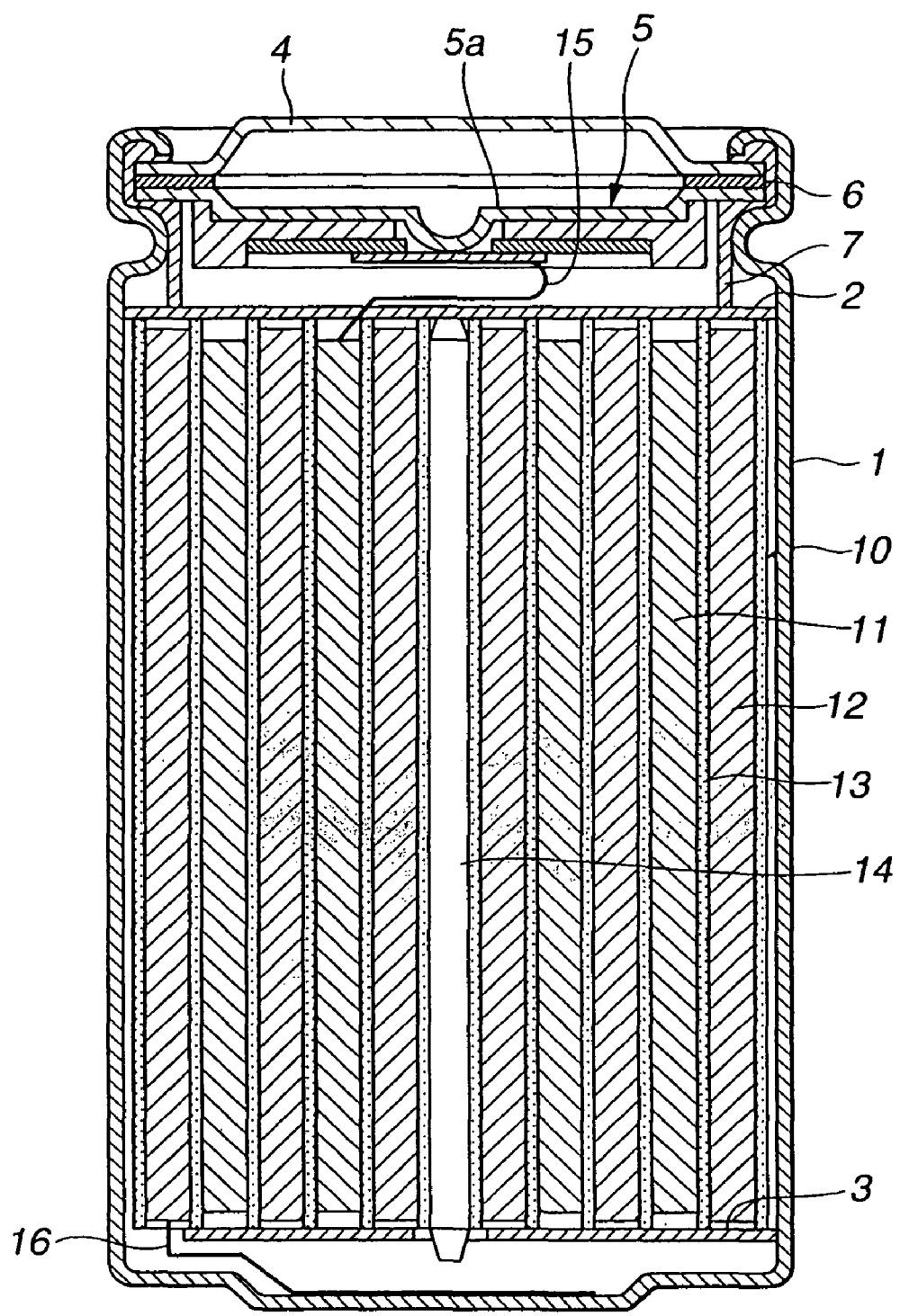
FIG. 1 is a longitudinal cross-sectional view showing an exemplary structure of a non-aqueous electrolyte secondary cell embodying the present invention.
Figure 2:
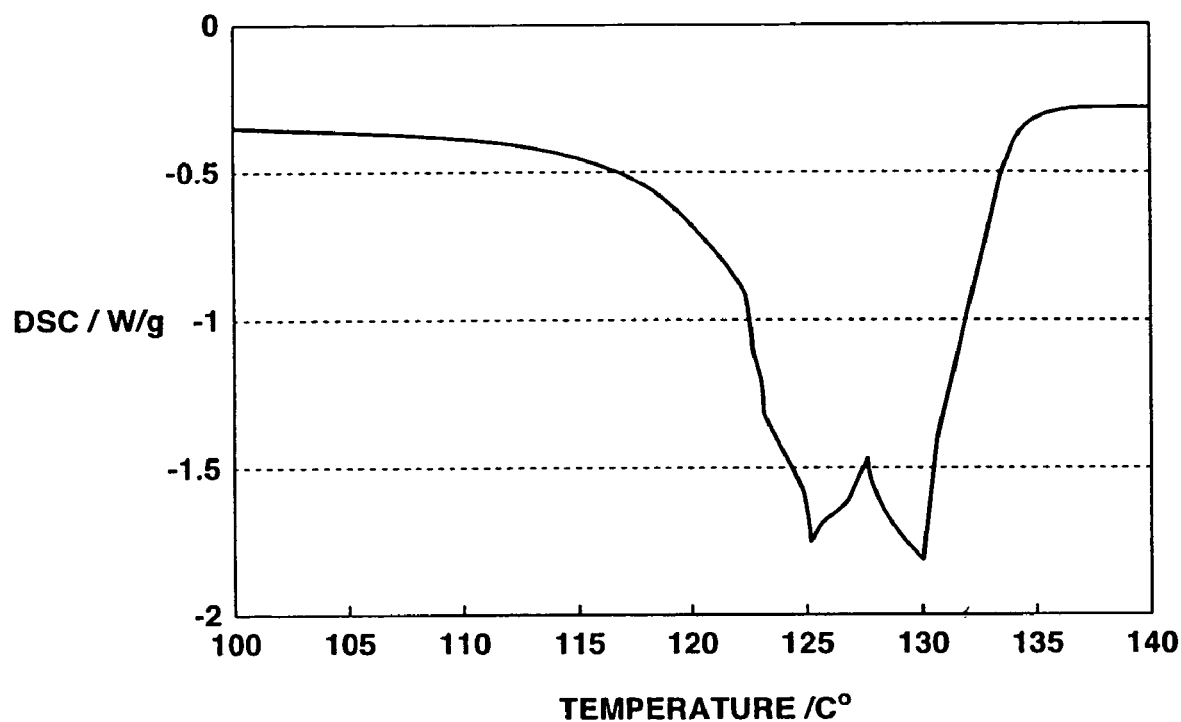
FIG. 2 is a graph showing a differential scanning calorific value curve of the first micro-porous film of the separator of a sample 33.

Referring to the drawings, a preferred embodiment of the present invention will be explained in detail. FIG. 1 shows a cross-sectional structure of a lithium ion secondary cell as a non-aqueous electrolyte secondary cell embodying the present invention. This non-aqueous electrolyte secondary cell is of the so-called cylindrical type, and includes a wound electrode 10 in the inside of a substantially hollow cylindrical cell can 1. The wound electrode 10 is comprised of a band-shaped cathode 11 an a band-shaped anode 12 coiled together interposing a separator 13. The cell can 1 is formed of nickel-plated iron (Fe) and has its one end and its opposite end closed and opened, respectively. Within the cell can 1 are arranged a pair of upstanding insulating plates 2, 3, at right angles to the peripheral surface of the wound electrode 10 as sandwiching the wound electrode 10 in-between.

On an open end of the cell can 1 are mounted a cell lid 4 and, inwardly of the cell lid 4, a safety valving mechanism 5 and a positive temperature coefficient device (PTC device) 6, by being caulked interposing a gasket 7, with the inside of the cell can 1 being hermetically sealed. The cell lid 4 is formed of, for example, the same material as that of the cell can 1. The safety valving mechanism 5 is electrically connected to the cell lid 4 via PTC device 6, such that, when the internal pressure in the cell rises above a predetermined value due to, for example, inner shorting or heating from outside, a disc plate 5a is inverted in its position to break the electrical connection between the cell lid 4 and the wound electrode 10. The PTC device 6 is increased in its resistance, with increasing temperature, to limit the current to prevent unusual heating otherwise caused by excessive current. For example, the PTC device 6 is formed of a barium titanate based semiconductor ceramic material. The gasket 7 is formed of, for example, an insulating material, and has its surface coated with asphalt.

The wound electrode 10 is wound about e.g., a center pin 14. A cathode lead 15 formed of, for example, aluminum (Al), and an anode lead 16 formed of, for example, nickel, are connected to a cathode 11 and to an anode 12 of the wound electrode 10, respectively. The cathode lead 15 is electrically connected to the cell lid 4 by being welded to the safety valving mechanism 5, while the anode lead 16 is electrically connected to the cell can 1 by welding.

The cathode 11 is formed by, for example, a layer(s) of a cathode mixture and a layer of a cathode collector, with the sole layer of the cathode mixture being provided to one surface of the cathode mixture layer or each one layer of the cathode mixture being provided to each surface of the cathode mixture layer. The layer of the cathode mixture is formed by, for example, a metal foil, such as an aluminum foil, a nickel foil or a stainless steel foil.

The cathode mixture layer is formed by a cathode active material, a binder and, if necessary an electrically conductive material, such as graphite. It should be noted that there is no particular limitation to the cathode active material used since it may differ from one cell to be fabricated to another. For example, there is no particular limitation to the material of the cathode active material, used in the preparation of the lithium cell or the lithium ion cell, on the condition that the material used is capable of occluding/releasing lithium. This material may, for example, be a spinel type lithium lithium manganese compound metal oxide, represented by, for example, $Li(Mn_{2-x-y} LiMy)O_4$, where M is at least one element selected from the group of B, Mg, Ca, Sr, Ba, Ti, V, Cr, Mn, Fe, Co, Ni, Cu, Al, Sn, Sb, In, Nb, Mo, W, Y, Ru and Rh, with $0 \leq x \leq 1$ and $0 \leq y \leq 0.4$, a composite oxide composed of lithium and a transition metal, with the general formula of $LiMnO_2$, where M is at least one element selected from the group of Co, Ni, Mn, Fe, Al, V and Ti, or an Li-containing inter-layer compound. Specified examples of these lithium composite oxides include $LiCoO_2$, $LiNiO_2$, $LiNzCo_{1-z}O_2$, where $0<z<1$, and $LiMn_2O_4$. These lithium composite oxides can generate a high voltage and prove a cathode active material having a superior energy density.

It is also possible to use $AMPO_4$, where A is alkali metal elements and M is at least one element selected from the group of Co, Ni, Mn, Fe, Al, V and Ti, or to use $LiTiS_2$, $LiMnO_2$, $LiMoO_2$, $LiWO_2$ and $LiV_2O_5$ containing alkali metal elements.

Plural sorts of these cathode active materials may be used in combination for the cathode.

It is possible to add suitable known electrical conductive agents or binders in forming a cathode using the above cathode active materials.

Similarly to the cathode 11, the anode 12 of such a structure in which a layer(s) of an anode active material is provided on one or both surfaces of the layer of an anode current collector. The layer of the anode current collector is formed by a metal foil, such as, for example, a copper foil, a nickel foil or a stainless steel foil. The layer of the anode mixture contains metal lithium, lithium alloys such as LiAl or one or more anode materials that are able to dope or undope lithium at a potential of, for example, not higher than 2V, with the potential of metal lithium as a reference potential. The anode mixture layer may also contain a binder, such as polyvinylidene fluoride.

The anode material that are able to dope or undope lithium may be enumerated by a carbon material, a metal oxide and a high molecular or polymer material. The carbon material may be exemplified by difficultly graphizable carbon, artificial graphite, cokes, graphites, vitreous carbons, sintered organic high molecular or polymer compounds, carbon fibers, activated coal and carbon blacks. Of these, the cokes may be exemplified by pitch coke, needle coke and petroleum coke.

The sintered organic high molecular compounds mean high molecular materials, such as phenolic resins or furane resins, sintered at a suitable temperature for carbonization. The metal oxides may be enumerated by oxides that are able to dope or undope lithium at a baser potential, such as iron oxide, ruthenium oxide, molybdenum oxide, tungsten oxide or tin oxide, that dopes or undopes lithium at a baser potential. Metal nitrides may also be used in similar manner. The high molecular material may be enumerated by an electrically conductive high molecular material, such as polyacetylene or poly-P-phinilene. It is also possible to use metals that can be alloyed with lithium and such metal alloys.

The high molecular material may also be metals or semiconductors that are able to form an alloy or a compound with lithium. In particular, the metal or semiconductor elements that are able to form an alloy or a compound with lithium are desirably the group 4B metal or semiconductor elements. Of these, silicon or tin, in particular tin, is preferred.

The separator 13 is formed by a plurality of layers of porous materials, stacked together. At least two of the plural layers of the porous materials differ from each other in porosity. In these layers with different values of porosity, the average pore diameter of the micro-sized pores of the layer with the highest porosity is selected to be larger than that of the layer with the lowest porosity.

That is, this separator 13 is comprised of at least two layers, namely a layer of a porous material having the small average pore diameter of the micro-sized pores and the lowest porosity, referred to below as the low porosity layer, and a layer of a porous material having the large average pore diameter of the micro-sized pores and the highest porosity, referred to below as the high porosity layer.

In the low porosity layer, the average pore diameter is small. When the cell is over-charged such that the inner temperature of the cell is increased, the separator undergoes endothermic reaction, so that its micro-sized pores are sealed. It should be noted that this low porosity layer has a small average pore diameter of the micro-sized pores, and the porosity is only small, so that the micro-sized pores can be stopped in a short time, thus achieving a superior shutdown effect.

For achieving such effect, the average pore diameter of the micro-sized pores is preferably 0.03 µm to 0.2 µm.

With the separator 13, having the above-mentioned low porosity layer as its constituent element, when the cell is overcharged, such that the inner temperature of the cell is raised, the micro-sized pores can be stopped in a short time, thus demonstrating a superior shutdown effect and high safety against over-charging.

In the high porosity layer, the average pore diameter of the micro-sized pores is larger than that of the low porosity layer, while the porosity of the micro-sized pores is higher than that of the low porosity layer. Thus, the high porosity layer assures optimum migration of the lithium ions across the cathode and the anode during charging/discharging of the cell.

For achieving such effect, the average pore diameter of the micro-sized pores of the high porosity layer is preferably on the order of 0.1 to 1 µm.

The separator 13, having the aforementioned high porosity layer, as its component element, exhibits satisfactory ion conductivity and superior low temperature characteristics.

So, the separator 13, in which respective different functions are assigned to the low porosity layer and to the high porosity layer, as its constituent elements, has the merit proper to the low porosity layer and the merit proper to the high porosity layer in combination.

Consequently, the separator 13 has both the high safety against over-charging and superior low-temperature characteristics, in combination, to give a non-aqueous electrolyte secondary cell superior in safety against over-charging and superior in low-temperature characteristics.

If the porosity of the low porosity layer is A and that of the high porosity layer is B, the ratio of the porosity of the low porosity layer to the porosity of the high porosity layer or A/B is preferably in a range from 44 to 93%. This ratio is referred to below as the porosity ratio A/B. When the porosity ratio A/B is less than 44%, that is if the porosity of the low porosity layer is excessively low as compared to the porosity of the high porosity layer, migration of lithium ions under low temperature environment is obstructed, thus lowering the low temperature characteristics of the non-aqueous electrolyte secondary cell.

If the porosity ratio A/B is larger than 93%, that is if the porosity of the low porosity is excessively high as compared to the porosity of the high porosity layer, the cell is overcharged, such that, when the inner temperature of the cell is raised, the speed at which the micro-sized pores is lowered. In such case, the shutdown effect cannot be displayed, such that sufficient safety against over-charging cannot be achieved.

The porosity of the low porosity layer is preferably 20 to 40%. If the porosity of the low porosity layer is too low, migration of lithium ions in a low temperature environment is obstructed, so that the low temperature characteristics of the non-aqueous electrolyte secondary cell tends undesirably to be lowered. On the other hand, if the porosity of the low porosity layer is too high, the rate of blocking the micro-sized pores is lowered when the cell is over-charged and the inner temperature of the cell is raised, with the result that the shutdown effect cannot be manifested and hence there is a risk that high safety against over-charging cannot be achieved.

The porosity of the high porosity layer is preferably 45 to 60%. If the porosity of the high porosity layer is too low, migration of lithium ions in a low temperature environment is obstructed, so that the low temperature characteristics of the non-aqueous electrolyte secondary cell tends undesirably to be lowered. On the other hand, if the porosity of the high porosity layer is too high, the rate of blocking the micro-sized pores is lowered when the cell is over-charged and the inner temperature of the cell is raised, with the result that the shutdown effect cannot be manifested and hence the high safety against over-charging cannot be sufficient.

In the present invention, the separator 13 does not have to be formed by two micro-sized films, that is the low porosity layer and the high porosity layer, but the separator may be made up by plural stacked layers each being formed of a porous material. In this case, the one of the plural layers of the separator that is of the lowest porosity corresponds to the aforementioned low porosity layer, with the layer having the maximum porosity corresponding to the high porosity layer. In this case, the porosity of the low porosity layer, the porosity of the low porosity layer and the ratio A/B of the porosity of the high porosity layer to that of the low porosity layer are preferably in the above ranges.

There is no particular limitation to the material making up the low porosity layer and the high porosity layer, such that any suitable materials that can be usually employed for the separator of this sort of the non-aqueous electrolyte secondary cell can be used. Of these materials, polyolefin is most preferred.

The low porosity layer and the high porosity layer may be formed of the same material or of different materials. In the present invention, the porosity values of the low porosity layer and the high porosity layer, the ratio thereof and the relative magnitudes of the average pore sizes of the micro-sized pores are crucial, there being no limitations to the micro-porous materials used.

The thickness of the low porosity layer is desirably in a range of from 2 to 55% of the thickness of the separator 13. When the thickness of the low porosity layer is less than 2% of the thickness of the separator 13, the ratio of the low porosity layer in the separator 13 is too small to realize an optimum shutdown effect. The cell temperature at the time of over-charging reaches a value which is the same as the usual value encountered in the prior-art practice, such that safety against overcharging is not optimum. When the thickness of the low porosity layer is larger than 55% of the thickness of the separator 13, the ratio of the low porosity layer in the separator 13 is excessive, such that migration of lithium ions in the low temperature environment is obstructed to lower the low temperature characteristics of the non-aqueous electrolyte secondary cell.

In the second aspect, the separator 13 is arranged between the cathode 11 and the anode to prevent physical contact therebetween. Also, the separator 13 holds the non-aqueous liquid electrolyte in the pores, that is, the separator 13 absorbs the non-aqueous liquid electrolyte to permit lithium ions to pass therethrough in charging/discharging.

The separator 13 has the so-called shutdown function. The shutdown function is such a function in which, when the temperature of the non-aqueous electrolyte secondary cell is raised for some reason, the micro-porous film forming the separator 13 is melted to stop the pores to caused forced cessation of the cell reaction.

By the separator 13 having the shutdown function, temperature rise of the non-aqueous electrolyte secondary cell may be suppressed even on occurrence of an unusual situation when the non-aqueous electrolyte secondary cell is shorted to suppress temperature rise of the cell to assure operational safety.

In the non-aqueous electrolyte secondary cell of the present invention, the separator 13 is made up by plural micro-porous films each having a multiplicity of micro-sized pores. The melting point of the micro-porous film proximate to the cathode 11 is set so as to be lower than that of the other micro-porous film(s).

In the following description, the 'micro-porous film proximate to the cathode' is simply termed 'cathode side micro-porous film' and the 'other micro-porous film(s)' are termed 'anode side micro-porous film(s)'.

In general, temperature rise of the non-aqueous electrolyte secondary cell in the overcharged state is largely ascribable to heat evolution in the cathode. Thus, if the micro-porous film of a relatively low melting point is arranged on the cathode side, the cathode side micro-porous film demonstrates the shutdown function at a lower temperature, that is, induces the endothermic reaction, to suppress the exothermic reaction of the non-aqueous electrolyte secondary cell more promptly. Consequently, temperature rise in the non-aqueous electrolyte secondary cell in an unusual situation can be suppressed reliably to achieve high safety.

Moreover, since the melting point of the anode side micro-porous film is set to a relatively higher value, the separator 13 may be improved in physical strength. The result is that inner shorting ascribable to punching of the separator 13 by the cathode 11 or the anode 12 may be suppressed to lower the inferiority fraction in cell manufacture, thus assuring improved productivity of the cell.

Conversely, should the separator be formed by a sole layer micro-porous film, the separator is weaker in strength thus possibly causing inner shorting. The result is that, if the cell is stored for long following its manufacture, the inferiority fraction is increased due to, for example, self-discharging.

If the separator structure is such that the micro-porous film of a relatively high melting point is arranged on the cathode side and the micro-porous film of a relatively low melting point is arranged on the anode side, there is caused delay in the endothermic reaction. The result is that temperature rise of the non-aqueous electrolyte secondary cell is induced under an unusual situation.

Meanwhile, the melting point of the micro-porous film means the temperature of the endothermic pak of the differential scanning calorific curve as measured using a differential scanning calorimetry (DSC).

The cathode side micro-porous film of the separator 13 embodying the present invention desirably has two or more melting points, that is two or more endothermic peaks in the differential scanning calorific curve. This further lowers the fraction of inferiority to improve productivity.

The thickness of the cathode side micro-porous film, referenced to the thickness of the separator 13, is preferably not less than 20% and not higher than 85%.

By the proportion of the cathode side micro-porous film in the separator 13 being in the above range, the effect of suppressing the temperature rise of the non-aqueous electrolyte secondary cell and the effect of maintaining high productivity may be achieved simultaneously.

If conversely the thickness of the cathode side micro-porous film referenced to the total thickness of the separator 13 is less than 20%, the fraction of inferiority is still low, however, temperature rise of the non-aqueous electrolyte secondary cell can possibly not be suppressed because of the small proportion of the low melting micro-porous film.

If the thickness of the cathode side micro-porous film referenced to the total thickness of the separator 13 exceeds 85%, temperature rise of the non-aqueous electrolyte secondary cell is suppressed, however, the fraction of inferiority tends to be increased because of the decreased strength of the separator 13. Meanwhile, the thickness of the cathode side micro-porous film referenced to the total thickness of the separator 13 is preferably not less than 26% and not higher than 74%.

The melting point of the cathode side micro-porous film is preferably not lower than 112° C. and not higher than 133° C. With the range of the cathode side micro-porous film in the above range, the strength of the separator 13 may be assured as the temperature rise in the non-aqueous electrolyte secondary cell is suppressed positively. If conversely the melting point of the cathode side micro-porous film is lower than 112° C., the fraction of inferiority tends to be higher, because of the decreased strength of the separator 13, even though temperature rise of the non-aqueous electrolyte secondary cell is suppressed. Moreover, if the melting point of the cathode side micro-porous film exceeds 133° C., it may be feared that the effect in suppressing the temperature rise in the non-aqueous electrolyte secondary cell may be lowered. Meanwhile, the melting point of the cathode side micro-porous film is more desirably not lower than 120° C. and not higher than 130° C.

The micro-porous film forming the separator 13 is preferably of the porosity not lower than 25% and not higher than 50%. With the porosity of the micro-porous film in the above range, it becomes possible to assure superior cell characteristics and to maintain high productivity.

If conversely the porosity of the micro-porous film forming the separator 13 is less than 25%, lithium ion migration in the separator 13 tends to be obstructed to lower the low temperature characteristics. When the porosity of the micro-porous film forming the separator 13 exceeds 50%, the anode active material and/or the cathode active material tends to be intruded into the pores of the separator 13 to cause inner shorting to increase the inferiority fraction.

The melting point of the anode side micro-porous film in the separator 13 is desirably not lower than 135° C. With the melting point of the anode side micro-porous film not lower than 135° C., the separator 13 is of sufficient strength to improve the productivity of the non-aqueous electrolyte secondary cell. If conversely the melting point of the anode side micro-porous film is less than 135° C., the separator 13 is decreased in strength to increase the fraction of inferiority.

It should be noted that the separator 13 embodying the present invention is not limited to the layered structure comprised of two micro-porous films. The present invention may be directed to a case wherein the anode side micro-porous film structure is comprised of plural micro-porous films, that is, to a case where the separator 13 is of a layered structure comprised of three or more micro-porous films.

The porous film may be prepared by a method roughly classified into a stretching method (dry method) and an extraction method (wet method).

The present invention is relative to a cell employing a porous laminated film structure including the steps of layering at least two films and stretching the layered films, as the width-wise length is maintained constant, to give a porous structure.

The present invention is also relative to a separator for a cell including a porous film laminate structure as a constituent element, wherein the porous film laminate structure is the aforementioned laminated structure for the cell.

In the present invention, the porous laminated film structure is preferably obtained on stretching as the width-wise length of the structure is maintained constant.

In the present invention, it is similarly desirable that the porous film laminate structure is obtained by uni-axially stretching a non-porous film laminate structure in the longitudinal direction and by compensating the decreased widthwise film length caused on uniaxial stretching by stretching in the transverse direction. Moreover, according to the present invention, such porous film laminate structure is desirable which has a Gurley value of 5 to 600 sec/100 cc and a tearing strength of not less than 1.5 kg/cm.

As a specified instance of the manufacturing method for a porous film laminate structure, there is, for example, a method including melt-extruding a propylene film and a polyethylene film, laminating the two films and subsequently stretching to produce a porous structure. This method may be used for preparation of the separator for a cell according to the present invention. The melt extrusion may be realized by, for example, a T-die method or by an inflation method. If, for example, a film is formed by melt molding by a T-die, molding is carried out routinely at a temperature higher by 20 to 100° C. than the melting temperature of the respective resins and usually at an withdrawing rate which may, for example, be 10 to 100 m/min without any particular limitation.

The aforementioned non-porous film laminate structure is stretched in the take-up direction of the non-porous film laminate structure to give a micro-porous structure. The method of stretching the film to give a micro-porous film structure may be enumerated by a method of stretching the film as both width-wise ends of the film are secured such as with chucks or pinch rolls for diminishing the decrease in the width-wise length of the porous film and a method of uniaxially stretching the film in the longitudinal direction and compensating for the decreased width-wise length of the film produced in uni-axial stretching. The porous film laminate structure of the present invention can be prepared by any of these methods.

The stretching temperature is 70 to 140° C. and preferably 100 to 135° C. The temperature outside this range is not desirable because sufficient porosity can then not be achieved. The multiplication factor for stretching is desirably 100 to 400% because too large a multiplication factor gives a larger Gurley value and too small a multiplication factor gives a smaller Gurley value.

On the other hand, if a polypropylene film laminated on, for example, a polyethylene film, it is desirable that low-temperature stretching and high-temperature stretching are carried out in this order. If the stretching temperature is too low, film breakage is liable to be produced during the operation, whereas, if the stretching temperature is too high, sufficient porosity cannot be achieved. The multiplication factor for low-temperature stretching is 5 to 200% It should be noted that too low stretching factor gives only low porosity, while too high a stretching factor fails to gibe the desired porosity or desired micro-sized pore diameter.

For decreasing the decreased width-wise length of the porous film in the stretching process, the non-porous film laminate structure is desirably heat treated in a hot air circulated oven. The decreasing method may be enumerated by, for example, a method including securing the film by a tenter and longitudinally uniaxially stretching the film at lower and higher temperature, and a method including longitudinally uniaxially stretching the film by high temperature stretching followed by high temperature transverse stretching. The temperature for high temperature transverse stretching is 70 to 135° C. and preferably 100 to 130° C. The stretching temperature outside this range is not desirable because high temperature transverse stretching fails to improve porosity, maximum pore diameter or Gurley values.

According to the present invention, it is preferred to carry out low temperature stretching and high temperature stretching followed by thermal fixation at the temperature of the high temperature stretching.

For thermal fixation (setting), the method including thermal contraction for decreasing the as-stretched film length by 10 to 50% at the outset for preventing contraction in the film stretching direction caused by residual stress caused by stretching, and a method of heating the film in a controlled fashion to prevent the size in the stretching direction from being changed. This thermal fixation gives a separator which satisfies the requirement for dimensional stability.

Method for Producing the Second Separator

First, a polyolefin resin is charged into a heating vessel and melted. The solution extruded from the die of the vessel is allowed to cool to give a gelled composition. For cooling, a method of directly contacting the film with cool air, cold water or the like cooling medium, or a method of contacting the film with a roll cooled by a cooling medium.

The gelled molded product is then stretched. For stretching, the gelled molded product is heated and stretched by a general method, such as a tentering method, a roll method, an inflation method, a pressure stretching method, either singly or in combination. Although uni-axial stretching or bi-axial stretching may be used, the bi-axial stretching is preferred. In this case, stretching may be made in the longitudinal direction and in the transverse direction simultaneously. Alternatively, sequential stretching may also be used.

The stretching temperature is not higher than the polyolefin melting temperature +10° C. and preferably from the crystal dispersion temperature of polyolefin to less than crystal melting point. The stretching factor is desirably not less than two and more preferably 3 to 30, depending on the thickness of the starting film. In case of the biaxial stretching, the stretching factor is not less than 10 and preferably 15 to 400 in terms of the surface factor. If the surface factor is 10 or less, stretching is insufficient, such that a micro-porous film of high elasticity and high strength cannot be achieved. If the surface factor exceeds 400, there is imposed limitation on the stretching operations.

The so stretched molded product is washed with a solvent to remove residual solvents. As washing agents may be readily volatilizable solvents, such as hydrocarbons, e.g., pentane, hexane or heptane, chlorinated hydrocarbons, e.g., methylene chloride or carbon tetrachloride, fluorinated hydrocarbons, such as ethane trifluoride, or ethers, e.g., diethylether or dioxane.

These solvents are suitably selected, depending on the solvent used for dissolving polyolefin, and are used either singly or in combination. For washing, a method of dipping the molded product in a solvent for extraction or a method of showering the solvent, may be used, either singly or in combination.

The above washing is conducted until the residual solvent in the stretched molded product is less than 1 wt %. The washing solvent is then dried either by heating or air drying. The stretched molded product, thus dried, is desirably thermally fixed in a temperature range from the crystal dispersion temperature to the melting point of polyolefin.

As for the porous film of the separator for a cell, thus prepared, the porosity ranges from 20 to 70% and preferably 35 to 60%, while the pore diameter of the micro-sized pores is 0.02 to 2 μm and preferably 0.05 to 0.5 μm. If the porosity is too low, the separator operation as the separator for a cell is insufficient, whereas, if it is too small, cell safety is lowered. The micro-sized pore diameter which is too small is not desirable because the ion mobility is lowered when the film is used as a separator for a cell. On the other hand, if the pore diameter of the micro-sized pores is too large, ion mobility is undesirably lowered.

For stretching a non-micro-porous film, more specifically, a three-layered non-porous laminated film structure, having intersecting directions of orientation, the laminated structure is desirably heat-treated for 30 minutes at 70 to 140° C., for example, at 120° C., and subsequently the laminated structure is stretched by 5-200%, e.g., 25% low-temperature stretching (initial stretching) at room temperature (25° C.) at a distortion speed of 40 to 400%/min.

Method of Measuring Physical Properties of the Porous Film Laminate Structure

In measuring the melting point of the porous film, a sample in a hermetically sealed vessel is raised in temperature, using DSC200 manufactured by Seiko Denshi Kogyo KK, from room temperature to 220° C., at a rate of 20° C./min, and maintained thereat for half an hour, after which the sample is cooled to room temperature at a rate of 2° C./min. The sample then is heated at a rate of 10° C./min, and the endothermic peak temperature during this process was adopted as a melting point.

(i) The Gurley Value was Measured in Accordance with JIS P8117.

A measurement device type B manufactured by Toyo Seiki KK was used for measurement. A test piece was loaded in a circular opening 28.6±0.1 mm and an area of 645 mm2 and placed under a load of the mass of 567±1.0 g to discharge air on the tube from the inside of the test circle to outside the tube. The time in which 100 cc of air is thus discharged was measured and adopted as the Gurley value (air permeability).

It should be noted that the Gurley value as tabulated is an average value of three values as measured at a width-wise mid point and two extreme end points in the width-wise direction TD). Also, the difference between the maximum and minimum values of the three Gurley values was found and indicated in the table as Gurley R max-min.

(ii) Tearing Strength (Emmendorf Tearing Method)

The tearing strength was measured using the JIS K7128B method. As the measurement device, an Emmendorf tearing tester manufactured by Toyo Seild KK was used. A notched number 1 test piece was mounted horizontally on the device and measurement was made of the tearing strength in the stretching direction (MD) and the width-wise direction (TD) of the test piece.

If, in the porous film laminate structure of the present invention, the Gurley value is excessively small, the micro-sized pores tend to be stopped in use, whereas, if the Gurley value is excessively large, the film strength is lowered. Thus, the Gurley value is preferably 100 to 600 sec/100 cc. On the other hand, if, in the porous film laminate structure, the tearing strength is excessively small, film breakage tends to be produced during cell manufacture or on decent in the course of use of the cell. So, the tearing strength is desirably not less than 1.5 kg/cm.

On the other hand, if at least one of the micro-porous film of the porous film laminate structure is a polyethylene or polypropylene film of the long and high molecular weight (average molecular weight: not lower than 500000 units), the tearing strength is desirably increased.

Method for Producing a Separator (a) 100 weight parts of a resin (1 g/10 min of homopolyethylene, manufactured by Grand Polymer KK) and 43 weight parts of an ethylene propylene block copolymer of 1.8 g/10 min of another resin and ethylene (content: 12.5%), manufactured by Nippon Polychem KK, were blended and melt-extruded from a cyclic die molding device to form a tubular non-porous film, 12 µm in thickness, oriented in the take-up direction.

The birefringence Δn of this film was $14 \times 10^{-3}$ and elastic restoration rate R was 63%.

This film then was slit spirally at angles of 15°, 22.5° band 30° with respect to the film take-up direction.

(b) High-density polyethylene, with MI of 0.3 (g/10 min), a melting point of 133° C., Mw of $3.8 \times 10^5$ and Mw/Mn, as measured by GPC, manufactured by Mitsui Kagaku KK under the trade name of M5202B, was melt-extruded by a T die molding device to produce a flattened non-porous film, 8 µm thick, oriented to a high degree in the take-up direction. The birefringence Δn of this film was $37 \times 10^{-3}$ and the elastic restoration rate RE was 37%.

(c) The first film (a), spirally slit, and the second film (b), were layered together. Then, a third film of (a), spirally slit, was placed on the second film to produce a three-layered film, which was caused to run on a heated nip roll, maintained at 130° C. and at a line pressure of 3.7 kg/cm, at a rate of 2 m/min to unify the three films together. The resulting three-layered non-porous laminated film structure was taken up.

(d) This three-layered non-porous laminated film structure was heat-treated at 120° C. for half an hour and put to 25% initial stretching, at a rate of 10 to 30 mm/min, under the conditions of the distance between clamp scissors of 100 mm and room temperature (25° C.), with the film structure being restrained in the width-wise direction with respect to the stretching direction.

The film structure was maintained at 120° C. for three minutes and stretched to 150% at 20 mm/min, as the film structure was restrained in the TD direction as described above. The film structure was thermally fixed for one minute to form a micro-porous film from the non-porous film.

The separator 13 may be prepared by a well-known conventional technique, such that a film lamination formed of porous material(s) may be used. Alternatively, at least one layer of the plural layers making up the separator 13 may be formed of a resin material, such as polyvinylidene fluoride, coated and dried in situ on another one of the plural layers. By employing this separator 13, the separator TT may be reduced in thickness.

The micro-porous film, forming the separator 13, is desirably formed of polyolefin. Specified examples of polyolefin include polyethylene and polypropylene.

This separator 13 is impregnated with a non-aqueous electrolyte, which is a liquid non-aqueous electrolyte. This non-aqueous electrolyte is composed, for example, of a lithium salt dissolved as an electrolyte salt in the non-aqueous solvent. This non-aqueous solvent may be enumerated by, for example, propylene carbonate, ethylene carbonate, diethyl carbonate, dimethyl carbonate, methyl ethyl carbonate, 1,2-dimethoxyethane, 1,2-diethoxyethane, γ-butyrolactone, tetrahydrofuran, 2-methyltetrahydrofuran, 1,3-dioxolane, 4-methyl-1,3-dioxolane, diethyl ether, sulforane, methyl sulforane, acetonitrile, propionitrile, anisole, acetic acid esters, such as methyl acetate or ethyl acetate, lactic acid esters, propionic acid esters, methyl formate, and ethyl formate. These compounds are used either singly or as a mixture.

The lithium salts may, for example, be enumerated by $LiClO_4$, $LiAsF_6$, $LiPF_6$, $LiBF_4$, $LiB(C_6H_5)$, $LiN(CF_3SO_2)_2$, $LiCH_3SO_3$, $LiCF_3SO_3$, LiCl and LiBr. These compounds are used either singly or as a mixture.

With the above-described non-aqueous electrolyte secondary cell, the separator 13 is formed by plural micro-porous films, arranged in layers. The melting point of the micro-porous film proximate to the cathode 11 is set so as to be lower than the melting point of the anode side micro-porous film. Thus, the cathode side micro-porous film quickly absorbs the heat evolved in the cathode to suppress temperature rise in the non-aqueous electrolyte secondary cell in the over-charged state. On the other hand, the anode side micro-porous film procures physical strength. That is, such a non-aqueous electrolyte secondary cell is produced in which high safety and reduced inferiority fraction with consequent high productivity may be assured by the synergistic effect of the cathode side micro-porous film and the anode side micro-porous film making up the separator.

There is no particular limitation to the method for producing the non-aqueous electrolyte secondary cell described above. For producing the anode 12 and the cathode 11, a method of adding known binders to the anode mixture or the cathode active material, adding a solvent and coating the resulting mixture, a method of adding known binders to the anode mixture or the cathode active material, heating and coating the resulting mixture, or a method of molding an anode mixture containing or not containing an electrically conductive material or binders to produce a molded electrode, may be used.

More specifically, the anode mixture or the cathode active material is mixed with a binder or an organic solvent to form a slurry which may then be coated on the anode current collector or a cathode current collector and dried to prepare the anode 12 or the cathode 11. Alternatively, the anode active material or the cathode active material is heated and molded in this heated state, without regard to whether or not the binder is used, to prepare the anode 12 or the cathode 11 endowed with high strength.

In the foregoing description, a separator is placed between the anode and the cathode and the resulting layered structure is wound a number of times about a winding core to produce a spirally wound electrode. However, the present invention is not limited to this specific configuration. For example, the cell may be a laminated cell prepared by sequentially layering the electrode and the separator. Also, in the preparation of a square-shaped cell, the anode and the cathode may be layered with a separator in-between and the resulting layered structure may then be applied a number of times around a winding core.

In the foregoing description, a non-aqueous electrolyte secondary cell employing a non-aqueous liquid electrolyte is taken as an example for explanation. However, the present invention is not limited to this configuration. That is, the present invention is applicable to a case wherein a solid electrolyte containing an electrolyte salt or a gelled electrode comprised of organic high molecular or polymer compound impregnated with a non-aqueous solvent and an electrolyte salt is used as the non-aqueous electrolyte.

As the solid electrolyte, an inorganic solid electrolyte or a high molecular solid electrolyte may be used provided that the electrolyte used exhibits lithium ion conductivity. Examples of the inorganic solid electrolyte include lithium nitride and lithium iodide. The high molecular solid electrolyte is composed of an electrolyte salt and a high molecular or polymer compound which dissolves the electrolyte salt. As the high molecular or polymer compound, etheric high molecular compound, such as poly(ethylene oxide) or cross-linked products thereof, a poly(methacylate) ester or an acylate, may be used alone, as a mixture or as a copolymer.

As the organic high molecular or polymer material, used for the gelled electrolyte, any of a variety of high molecular or polymer materials capable of absorbing organic solvents to form a gel may be used. Specified organic high molecular or polymer compounds include fluorine-based high molecular compounds, such as poly(vinylidene fluoride) or vinylidene fluoride-co-hexafluoro propylene, an etheric high molecular compound, such as poly(ethylene oxide) or cross-linked products thereof, or poly(methacylate), may be used. In particular, fluorine-based high molecular or polymer compounds are preferably used in light of redox stability. Meanwhile, these organic compounds manifest ionic conductivity by containing an electrolyte salt.

In the foregoing description, a cylindrically-shaped non-aqueous electrolyte secondary cell is taken as an example for explanation. Alternatively, the cell shape may also be square-shaped, coin-shaped, button-shaped or laminated, without any particular limitation. Additionally, the present invention may be applied to both the primary cell and to the secondary cell.

First Aspect of the Invention

The non-aqueous electrolyte secondary cell, constructed as described above, operates as follows:

When the non-aqueous electrolyte secondary cell is charged, lithium ions are released from the cathode 11, so as to be occluded in the anode 12 through the electrolyte impregnated in the separator 13. When the non-aqueous electrolyte secondary cell is discharged, lithium ions are released from the anode 12 so as to be occluded in the cathode 11 through the electrolyte impregnated in the separator 13.

This non-aqueous electrolyte secondary cell can, for example, be prepared as follows:

First, manganese-containing oxides, nickel-containing oxides and, if necessary, an electrical conductive agent and a binder are mixed together to prepare a cathode mixture, which cathode mixture is then dispersed in a solvent, such as N-methyl-2-pyrrolidone to form a paste-like slurry of the cathode mixture. This cathode mixture slurry is coated on a layer of a cathode current collector. The solvent is then dried off and the resulting mass is compression-molded to form a layer of the cathode mixture to form a cathode 11.

Then, an anode material and, if necessary, a binder, are mixed together to form an anode mixture, which anode mixture is then dispersed in a solvent, such as N-methyl-2-pyrrolidone, to form a paste-like slurry of the anode mixture. This anode mixture slurry is then coated on the layer of the anode current collector. The solvent is then dried off and the resulting mass is compression-molded, such as with a roll press, to form a layer of the anode mixture to form an anode 12.

A cathode lead 15 is mounted to the layer of the cathode current collector, such as by welding, while an anode lead 16 is mounted to the layer of the anode current collector such as by welding. The cathode 11 and the anode 12 are then coiled together, with the separator 13 in-between, and a safety valve mechanism 5 is welded to the distal end of the cathode lead 15, while the distal end of the anode lead 16 is welded to the cell can 1. The cathode 11 and the anode 12, thus coiled together, are sandwiched between a pair of insulating plates 2, 3 and housed within the cell can 1.

The separator is comprised of plural layers of porous materials, that is materials having micro-sized pores. At least two of the layers of the porous materials are of different values of porosity. The average pore diameter of the one of the layers with the different values of the porosity which has the highest porosity is selected to be larger than the average pore diameter of the layer having the lowest porosity.

The cathode 11 and the anode 12 are then housed in the inside of the cell can 1 and subsequently the non-aqueous electrolyte is charged into the inside of the cell can 1, whereby the separator 13 is impregnated with the non-aqueous electrolyte.

The cell lid 4, safety valving mechanism 5 and the PTC device 6 are caulked at the opening end of the cell can 1 interposing the gasket 7 and secured in position. This completes the non-aqueous electrolyte secondary cell shown in FIG. 1.

There is no particular limitation to the method of producing the cathode and the anode. That is, a variety of methods may be used, such as a method of adding a known binder and a solvent to the active material to coat the resulting product on a current collector, a method of adding a known binder to an active material and coating the resulting mixture on a current collector, or a method of molding an active material alone or an active material mixed with an electrical conductive agent or a binder to form a molded electrode. An electrode having a high strength may also be prepared by pressure molding an active material under heat application, irrespective of whether or not a binder is mixed into the active material.

In the above-described method, the cathode and the anode are coiled together with the separator in-between. Alternatively, such methods may be used which consist in winding a cathode and an anode around a core with a separator in-between, or in sequentially layering the electrodes and the separator.

Moreover, although the lithium secondary cell is taken as an example in the foregoing description, the present invention is not limited to the above description and may be modified appropriately without departing from the scope of the invention.

That is, although a specified structure of a cylindrically-shaped non-aqueous electrolyte secondary cell having a coiled structure is taken as an example in the foregoing description, the present invention may be applied to a cylindrically-shaped non-aqueous electrolyte secondary cell having a different structure from that described above. The cell shape also is not limited to the cylindrical shape, such that the present invention may be applied to non-aqueous electrolyte secondary cells of various shapes other than the cylindrical shape, such as, for example, a coin shape, a button shape, a square shape or a shape having an electrode device sealed in the inside of a laminate film.

Although the case of employing a non-aqueous electrolyte composed of an electrolyte salt as a non-aqueous electrolyte dissolved in a non-aqueous solvent is taken as an example for explanation, the present invention is not limited thereto and may use a solid electrolyte having an electrolyte contained therein or a gelled electrolyte comprised of a high molecular material impregnated with a non-aqueous electrolyte comprised of an electrolyte salt dissolved in a non-aqueous solvent.

For example, an inorganic solid electrolyte or a high molecular solid electrolyte may be used as the solid electrolyte, on the condition that the electrolyte used exhibits lithium ion conductivity. The inorganic solid electrolyte may be exemplified by, for example, lithium nitride and lithium iodide. The high molecular solid electrolyte is composed of an electrolyte salt and a high molecular compound which dissolves the electrolyte salt. The high molecular compound may, for example, be an ether based high molecular material, such as poly(ethylene oxide) or a cross-linked product thereof, a poly(methacrylate) ester based compound or an acrylate based compound, either singly or as a mixture in the molecules of the electrolyte salt. Alternatively, the high molecular compound may be copolymerized in the molecules of the electrolyte salt.

As the electrolyte used as the gelled electrolyte, lithium salts, such as, for example, $LiClO_4$, $LiAsF_6$, $LiPF_6$, $LiBF_4$, $LiB(C_6H_5)$, $LiN(CF_3SO_2)_2$, $LiCH_3SO_3$, $LiCF_3SO_3$, LiCl or LiBr, may be employed. These may be used either singly or in combination. The electrolyte salt is desirably added in an amount corresponding to the concentration of the gelled electrolyte in the non-aqueous solvent of 0.8 to 2.0 mol/l so as to give an optimum ion conductivity.

The non-aqueous solvent used for the gelled electrolyte may be enumerated by, for example, ethylene carbonate, propylene carbonate, butylene carbonate, vinylidene carbonate, γ-butyrolactone, γ-valerolactone, diethoxyethane, tetrahydrofuran, 2-methyltetrahydrofuran, 1,3-dioxolane, methyl acetate, methyl propionate, dimethyl carbonate, diethyl carbonate, methylethyl carbonate, 2,4-difluoroanisole, 2,6-difluoroanisole and 4-bromo velatrol. These may be used singly or in combination.

It is noted that a variety of high molecular materials may be used, provided that the material used is gelled on absorption of a non-aqueous electrolyte. These high molecular materials or polymer may be enumerated by, for example, fluorine-based high molecular materials, such as polyvinylidene fluoride, copolymers thereof, poly(vinylidene fluoride) and poly(vinylidene fluoride-CO-hexafluoro propylene.

As monomers of the polyvinylidene fluoride copolymer, hexafluoro propylene or tetrafluoroethylene, for example, may be used. If polyvinylidene fluoride is used as a gelled electrode, it is desirable to use such a gelled electrolyte comprised of a multi-component high molecular material or polymer composed of polyvinylidene fluoride copolymerized with polyhexafluoro propylene and polyethylelen tetrafluoride. By using this multi-component high molecular material or polymer, a gelled electrolyte having a high mechanical strength can be produced.

It is more desirable to use a multi-component high molecular material or polymer comprised of polyvinylidene fluoride and polyhexafluoro propylene. With use of this multi-component high molecular material or polymer, it is possible to produce a gelled electrolyte having a higher mechanical strength.

As the high molecular material or polymer, used for the gelled electrolyte, etheric high molecular materials, such as polyethylene oxide or polyethylene oxide, may be used. As the monomers for the polyethylene oxide copolymer, polypropylene oxide, methyl methacrylate, butyl methacrylate, methyl acrylate or butyl acrylate, may be used.

As the high molecular material or polymer used for the gelled electrolyte, polyacrylonitrile or copolymers thereof may also be used.

As the monomers for the polyacrylonitrile copolymer, vinyl acetate, methyl methacrylate, butyl methacrylate, methyl acrylate, butyl acrylate, itaconic acid, hydrogenated methyl acrylate, hydrogenated ethyl acrylate, acrylamide, vinyl chloride, vinylidene fluoride and vinylidene chloride, may be used. Additionally, acrylonitrile butadiene rubber, acrylonitrile butadiene styrene resins, acrylonitrile polyethylene chloride propylene diene styrenic resin, an acrylonitrile vinyl chloride resins, acrylonitrile methyl acrylate resins or acrylonitrile acrylate resin, may be used.

Of these, fluorine based high molecular materials are most preferred in the perspective of redox stability.

The present invention is hereinafter explained on the basis of specified experimental results. In the following experiments, the separator porosity is measured with mercury porosimeter Pore Master 33p manufactured by Yuasa Ionic Co. Ltd. and from a pore distribution curve obtained from the mercury quantity and pressure relative to the average pore diameter.

<Sample 1>

In the sample 1, a non-aqueous electrolyte secondary cell was prepared as follows:

First, a cathode was prepared.

0.5 mol of lithium carbonate and 1 mol of cobalt carbonate were mixed and the resulting mixture was sintered in air for five hours at a temperature of 850° C. The material produced was put to X-ray diffractometry, which indicated satisfactory coincidence with a $LiCoO_2$ peak registered in the JCPD file.

This $LiCoO_2$ then was pulverized to powders with an average particle size of 5 μm.

95 weight parts of $LiCoO_2$ and 5 weight parts of lithium carbonate powders were then mixed together to give a mixture. 91 weight parts of this mixture, 6 weight parts of an electrically conductive material and 3 weight parts of a binder were mixed together to form a cathode mixture. As the electrically conductive material and the binder, flaky graphite and PVDF were used, respectively.

The cathode mixture was then dispersed in N-methyl pyrrolidone to form a slurry, which slurry then was evenly applied to both sides of a band-shaped aluminum foil, as a cathode current collector, 20 μm in thickness, and dried in situ to form a layer of the cathode active material. This cathode current collector layer was compression-molded, under a preset pressure, using a roll press, to form a cathode.

The anode then was prepared as follows:

30 weight parts of coal tar pitch as a binder were added to 100 weight parts of petroleum coke as a filler. The resulting mass was mixed at approximately 100° C. and compression-molded by a press to form a molded carbon product as a precursor. This precursor was heat-treated at a temperature not higher than 1000° C. to give a molded carbon mass. This molded carbon mass was impregnated with a coal tar pitch, melted at a temperature not higher than 200° C. The resulting mass was heat-treated at a temperature not higher than 1000° C. by way of pitch impregnation/heat treatment process. This process was repeated several times. The resulting product was heat-treated in an inert atmosphere at 2800° C. to form a graphized molded product, which then was pulverized and classified to form powders.

The so produced graphized powders were put to structural analyses by an X-ray diffractometry, from which it was found that the plane-to-plane spacing of the (002) plane was 0.337 nm, and that the C-axis crystallite thickness of the (002) plane was 50.0 nm. The true density as found by the picnometric method was 2.23 g/cm$^3$, with the bulk density being 0.98 g/cm$^3$. The specific surface area as found by the BET (Brunauer, Emmelt and Teller) method was 1.6 m2/g. As for the grain size distribution, as found by the laser diffraction method, the average grain size was 33.0 µm, the cumulative 10% grain size was 13.3 µm, cumulative 50% grain size was 30.6 µm and the cumulative 90% grain size was 55.7 µm.

In addition, the destruction strength of graphized particles, as found using SHIMAZU micro compression tester, manufactured by Shimazu Seisakusho Co. Ltd, was 7.1 kgf/mm$^2$ on an average.

After obtaining the graphized powders, 90 weight parts of these powders and 10 weight parts of the binder were mixed together to form an anode mixture. As the binder, PVDF was used.

The anode mixture was then dispersed in N-methyl pyrrolidone as a solvent to form a slurry. This slurry was evenly coated on both sides of a band-shaped copper foil, as an anode current collector, 10 µm in thickness, and dried to form a layer of an anode active material, which then was compression molded under a preset pressure, using a roll press, to prepare an anode.

The cathode, separator and the anode, thus prepared, were layered in the order of the anode, separator, cathode, separator and so on, to form a spirally wound electrode unit having an outer diameter of 18 mm.

As the separator, a two-layered separator composed of a film A formed by a micro-porous polyethylene (PE), having an average pore diameter of 0.1 µm, porosity of 40% and a thickness of 5 µm, and a film B formed by a micro-porous polyethylene, having an average pore diameter of 0.1 µm, porosity of 45% and a thickness of 25 µm, was used. That is, in this separator, the film A operates as the low porosity layer, and the film B operates as a high porosity layer, with the ratio A/B of the porosity of the low porosity layer to that of the high porosity layer being 88.9%. The ratio of the thickness of the low porosity layer, that is the film A, to the separator thickness is 16.7%.

On the bottom of an iron cell can, the inner surface of which has been plated with nickel, was placed an insulating plate, a spirally-shaped electrode unit was housed therein and another insulating plate was set on this spirally-shaped electrode unit.

For collecting the current at the anode, one end of a nickel anode lead was press-fitted to the anode, while the opposite end of the anode lead was welded to the cell can. For collecting the current at the cathode, one end of an aluminum cathode lead was mounted to the cathode, while its opposite end was electrically connected to the cell lid via a current-breaking thin plate, which serves for breaking the current depending on the inner cell pressure.

A non-aqueous electrolyte liquid was then charged into the cell can. As the non-aqueous electrolyte liquid, a mixture of LiPF6, ethylene carbonate and dimethyl carbonate, with a weight ratio of 10:40:50, was used.

Finally, the cell can was caulked with an insulating sealing gasket, coated with asphalt, to secure the safety valve device, having the current breaking mechanism, PTC device and the cell lid, to keep the inside of the cell air-tight to form a cylindrically-shaped non-aqueous electrolyte secondary cell having a diameter of 18 mm and a height of 65 mm.

<Sample 2>
A cylindrically-shaped non-aqueous electrolyte secondary cell of a sample 2 was prepared in the same way as sample 1, except using, as a separator, a two-layered separator comprised of a layer of micro-porous polyethylene with an average pore diameter of 0.1 µm, a porosity of 41% and a thickness of 5 µm, and a layer of micro-porous polyethylene with an average pore diameter of 0.1 µm, a porosity of 45% and a thickness of 25 µm.

<Sample 3>
A cylindrically-shaped non-aqueous electrolyte secondary cell of a sample 3 was prepared in the same way as sample 1, except using, as a separator, a two-layered separator comprised of a layer of micro-porous polyethylene with an average pore diameter of 0.1 µm, a porosity of 42% and a thickness of 5 µm, and a layer of micro-porous polyethylene with an average pore diameter of 0.1 µm, a porosity of 45% and a thickness of 25 µm.

<Sample 4>
A cylindrically-shaped non-aqueous electrolyte secondary cell of a sample 4 was prepared in the same way as sample 1, except using, as a separator, a two-layered separator comprised of a layer of micro-porous polyethylene with an average pore diameter of 0.1 µm, a porosity of 37% and a thickness of 5 µm, and a layer of micro-porous polyethylene with an average pore diameter of 0.1 µm, a porosity of 45% and a thickness of 25 µm.

<Sample 5>
A cylindrically-shaped non-aqueous electrolyte secondary cell of a sample 5 was prepared in the same way as sample 1, except using, as a separator, a two-layered separator comprised of a layer of micro-porous polyethylene with an average pore diameter of 0.1 µm, a porosity of 30% and a thickness of 5 µm, and a layer of micro-porous polyethylene with an average pore diameter of 0.1 µm, a porosity of 45% and a thickness of 25 µm.

<Sample 6>
A cylindrically-shaped non-aqueous electrolyte secondary cell of a sample 6, was prepared in the same way as sample 1, except using, as a separator, a two-layered separator comprised of a layer of micro-porous polyethylene with an average pore diameter of 0.1 µm, a porosity of 25% and a thickness of 5 µm, and a layer of micro-porous polyethylene with an average pore diameter of 0.1 µm, a porosity of 45% and a thickness of 25 µm.

<Sample 7>
A cylindrically-shaped non-aqueous electrolyte secondary cell of a sample 7 was prepared in the same way as sample 1, except using, as a separator, a two-layered separator comprised of a layer of micro-porous polyethylene with an average pore diameter of 0.1 µm, a porosity of 20% and a thickness of 5 µm, and a layer of micro-porous polyethylene with an average pore diameter of 0.1 µm, a porosity of 45% and a thickness of 25 µm.

<Sample 8>

A cylindrically-shaped non-aqueous electrolyte secondary cell of a sample 8 was prepared in the same way as sample 1, except using, as a separator, a two-layered separator comprised of a layer of micro-porous polyethylene with an average pore diameter of 0.1 µm, a porosity of 40% and a thickness of 10 µm, and a layer of micro-porous polyethylene with an average pore diameter of 0.1 µm, a porosity of 45% and a thickness of 20 µm.

<Sample 9>

A cylindrically-shaped non-aqueous electrolyte secondary cell of a sample 9 was prepared in the same way as sample 1, except using, as a separator, a two-layered separator comprised of a layer of micro-porous polyethylene with an average pore diameter of 0.1 µm, a porosity of 40% and a thickness of 15 µm, and a layer of micro-porous polyethylene with an average pore diameter of 0.1 µm, a porosity of 45% and a thickness of 15 µm.

<Sample 10>

A cylindrically-shaped non-aqueous electrolyte secondary cell of a sample 10, was prepared in the same way as sample 1 except using, as a separator, a two-layered separator comprised of a layer of micro-porous polyethylene with an average pore diameter of 0.1 µm, a porosity of 40% and a thickness of 16.5 µm, and a layer of micro-porous polyethylene with an average pore diameter of 0.1 µm, a porosity of 45% and a thickness of 13.5 µm.

<Sample 11>

A cylindrically-shaped non-aqueous electrolyte secondary cell of a sample 11 was prepared in the same way as sample 1, except using, as a separator, a two-layered separator comprised of a layer of micro-porous polyethylene with an average pore diameter of 0.1 µm, a porosity of 40% and a thickness of 3 µm, and a layer of micro-porous polyethylene with an average pore diameter of 0.1 µm, a porosity of 45% and a thickness of 27 µm.

<Sample 12>

A cylindrically-shaped non-aqueous electrolyte secondary cell of a sample 12, was prepared in the same way as sample 1 except using, as a separator, a two-layered separator comprised of a layer of micro-porous polyethylene with an average pore diameter of 0.1 µm, a porosity of 40% and a thickness of 2 µm, and a layer of micro-porous polyethylene with an average pore diameter of 0.1 µm, a porosity of 45% and a thickness of 28 µm.

<Sample 13>

A cylindrically-shaped non-aqueous electrolyte secondary cell of a sample 13 was prepared in the same way as sample 1, except using, as a separator, a two-layered separator comprised of a layer of micro-porous polyethylene with an average pore diameter of 0.1 µm, a porosity of 40% and a thickness of 1.5 µm, and a layer of micro-porous polyethylene with an average pore diameter of 0.1 µm, a porosity of 45% and a thickness of 28.5 µm.

<Sample 14>

A cylindrically-shaped non-aqueous electrolyte secondary cell of a sample 14 was prepared in the same way as sample 1, except using, as a separator, a separator obtained on coating polyvinylidene fluoride, to a thickness of 1 µm, on micro-porous polyethylene, having an average pore diameter of 0.1 µm, a porosity of 45% and a thickness of 29 µm, and drying the resulting product. The porosity of polyvinylidene fluoride was 40%.

<Sample 15>

A cylindrically-shaped non-aqueous electrolyte secondary cell of a sample 15 was prepared in the same way as sample 1, except using, as a separator, a separator obtained on coating polyvinylidene fluoride, to a thickness of 0.6 µm, on micro-porous polyethylene, having an average pore diameter of 0.1 µm, a porosity of 45% and a thickness of 29.4 µm, and drying the resulting product. The porosity of polyvinylidene fluoride was 40%.

<Sample 16>

A cylindrically-shaped non-aqueous electrolyte secondary cell of a sample 16 was prepared in the same way as sample 1, except using, as a separator, a three-layered separator made up by micro-porous polyethylene with an average pore diameter of 0.1 µm, a porosity of 40% and a thickness of 5 µm, micro-porous polyethylene with an average pore diameter of 0.1 µm, a porosity of 45% and a thickness of 20 µm and micro-porous polyethylene with an average pore diameter of 0.1 µm, a porosity of 47% and a thickness of 5 µm.

<Sample 17>

A cylindrically-shaped non-aqueous electrolyte secondary cell of a sample 17 was prepared in the same way as sample 1, except using, as a separator, a three-layered separator made up by micro-porous polyethylene with an average pore diameter of 0.1 µm, a porosity of 45% and a thickness of 12.5 µm, micro-porous polyethylene with an average pore diameter of 0.1 µm, a porosity of 40% and a thickness of 5 µm and micro-porous polyethylene with an average pore diameter of 0.1 µm, a porosity of 45% and a thickness of 12.5 µm.

<Sample 18>

A cylindrically-shaped non-aqueous electrolyte secondary cell of a sample 18, was prepared in the same way as sample 1 except using, as a separator, a three-layered separator made up by micro-porous polyethylene with an average pore diameter of 0.1 µm, a porosity of 40% and a thickness of 5 µm, micro-porous polyethylene with an average pore diameter of 0.1 µm, a porosity of 45% and a thickness of 20 µm and micro-porous polyethylene with an average pore diameter of 0.1 µm, a porosity of 47% and a thickness of 5 µm.

<Sample 19>

A cylindrically-shaped non-aqueous electrolyte secondary cell of a sample 19 was prepared in the same way as sample 1, except using, as a separator, a two-layered separator made up by micro-porous polyethylene with an average pore diameter of 0.1 µm, a porosity of 40% and a thickness of 15 µm and micro-porous polyethylene with an average pore diameter of 0.1 µm, a porosity of 47% and a thickness of 15 µm.

<Sample 20>

A cylindrically-shaped non-aqueous electrolyte secondary cell of a sample 20 was prepared in the same way as sample 1, except using, as a separator, a two-layered separator made up by micro-porous polyethylene with an average pore diameter of 0.1 µm, a porosity of 40% and a thickness of 15 µm and micro-porous polyethylene with an average pore diameter of 0.1 µm, a porosity of 55% and a thickness of 15 µm.

<Sample 21>

A cylindrically-shaped non-aqueous electrolyte secondary cell of a sample 21 was prepared in the same way as sample 1, except using, as a separator, a two-layered separator made up by micro-porous polyethylene with an average pore diameter of 0.1 µm, a porosity of 40% and a thickness of 15 µm and micro-porous polyethylene with an average pore diameter of 0.1 µm, a porosity of 60% and a thickness of 15 µm.

<Sample 22>

A cylindrically-shaped non-aqueous electrolyte secondary cell of a sample 22 was prepared in the same way as sample 1, except using, as a separator, a separator made up solely by micro-porous polyethylene with an average pore diameter of 0.1 µm, a porosity of 45% and a thickness of 30 µm.

<Sample 23>

A cylindrically-shaped non-aqueous electrolyte secondary cell of a sample 23 was prepared in the same way as sample 1, except using, as a separator, a two-layered separator made up by micro-porous polyethylene with an average pore diameter of 0.1 µm, a porosity of 43% and a thickness of 5 µm and micro-porous polyethylene with an average pore diameter of 0.1 µm, a porosity of 45% and a thickness of 25 µm.

<Sample 24>

A cylindrically-shaped non-aqueous electrolyte secondary cell of a sample 24 was prepared in the same way as sample 1, except using, as a separator, a two-layered separator made up by micro-porous polyethylene with an average pore diameter of 0.1 µm, a porosity of 17% and a thickness of 5 µm and micro-porous polyethylene with an average pore diameter of 0.1 µm, a porosity of 45% and a thickness of 25 µm.

<Sample 25>

A cylindrically-shaped non-aqueous electrolyte secondary cell of a sample 25 was prepared in the same way as sample 1, except using, as a separator, a two-layered separator made up by micro-porous polyethylene with an average pore diameter of 0.1 µm, a porosity of 13% and a thickness of 5 µm and micro-porous polyethylene with an average pore diameter of 0.1 µm, a porosity of 45% and a thickness of 2.5 µm.

<Sample 26>

A cylindrically-shaped non-aqueous electrolyte secondary cell of a sample 26 was prepared in the same way as sample 1, except using, as a separator, a separator obtained on coating polyvinylidene fluoride, to a thickness of 0.2 µm, on micro-porous polyethylene, having an average pore diameter of 0.1 µm, a porosity of 45% and a thickness of 20 µm, and drying the resulting product. The porosity of polyvinylidene fluoride was 40%.

<Sample 27>

A cylindrically-shaped non-aqueous electrolyte secondary cell of a sample 27 was prepared in the same way as sample 1, except using, as a separator, a two-layered separator made up by micro-porous polyethylene with an average pore diameter of 0.1 µm, a porosity of 40% and a thickness of 18 µm and micro-porous polyethylene with an average pore diameter of 0.1 µm, a porosity of 40% and a thickness of 12 µm.

<Sample 28>

A cylindrically-shaped non-aqueous electrolyte secondary cell of a sample 28 was prepared in the same way as sample 1 except using, as a separator, a two-layered separator made up by micro-porous polyethylene with an average pore diameter of 0.1 µm, a porosity of 40% and a thickness of 15 µm and micro-porous polyethylene with an average pore diameter of 0.1 µm, a porosity of 65% and a thickness of 15 µm.

The following over-charging test was conducted on the cylindrically-shaped non-aqueous electrolyte secondary cells of the samples 1 to 28, prepared as described above, to evaluate the charging safety of the non-aqueous electrolyte secondary cells. The over-charging safety was evaluated by the maximum temperature reached on the cell surface.

The following charging/discharging test was also conducted to evaluate low temperature characteristics of the non-aqueous electrolyte secondary cells.

Over-Charging Test

The over-charging test was conducted by bonding a thermocouple on the surface of each cell, carrying out a constant current constant voltage test under the condition of an upper limit voltage of 18 V, a current of 1.6 A and the charging time of four hours, in an atmosphere of 23° C., and by measuring the maximum temperature reached on the surface of the non-aqueous electrolyte secondary cell (referred to below as the maximum reached temperature in over-charging). The results are shown in Tables 1 and 2 together with the conditions for the preparation of the samples.

Tests on Ow-Temperature Characteristics

In conducting the tests on ow-temperature characteristics, the respective cells were put to constant current constant voltage charging, in a constant temperature vessel set to 23° C., under the conditions of the upper limit voltage of 4.2 V, current of 1 A and the charging time duration of three hours. After this charging, the cells were 0. discharged at a constant current of 8 A up to a terminal voltage of 3.0 V;

1. then put to constant current constant voltage charging under the conditions of the upper limit voltage of 4.2V, current of 1 A and the charging time of three hours;

2. then allowed to stand for three hours in a constant temperature vessel set at –20° C. and, in the constant temperature vessel, set at –20° C., 3. put to a constant current discharging of 0.8 A up to a terminal voltage of 3.0 V;

4. with the discharging capacity in the 23° C. atmosphere and that in the –20° C. atmosphere being termed 5. the 23° C. cell capacity and the –20° C. cell capacity, respectively. The results are also shown in Table 2.

TABLE 1

| | first layer thickness (µm) | second layer thickness (µm) | third layer thickness (µm) | first layer mean pore size (µm) | second layer mean pore size (µm) | third layer mean pore size (µm) |
|---|---|---|---|---|---|---|
| sample 1 | 5 | 25 | 0 | 0.12 | 0.2 | — |
| sample 2 | 5 | 25 | 0 | 0.14 | 0.2 | — |
| sample 3 | 5 | 25 | 0 | 0.15 | 0.2 | — |
| sample 4 | 5 | 25 | 0 | 0.1 | 0.2 | — |
| sample 5 | 5 | 25 | 0 | 0.06 | 0.2 | — |
| sample 6 | 5 | 25 | 0 | 0.04 | 0.2 | — |
| sample 7 | 5 | 25 | 0 | 0.03 | 0.2 | — |
| sample 8 | 10 | 20 | 0 | 0.12 | 0.2 | — |
| sample 9 | 15 | 15 | 0 | 0.12 | 0.2 | — |
| sample 10 | 16.5 | 13.5 | 0 | 0.12 | 0.2 | — |
| sample 11 | 3 | 27 | 0 | 0.12 | 0.2 | — |

TABLE 1-continued

| | | | | | | | |
|---|---|---|---|---|---|---|---|
| sample 12 | 2 | 28 | 0 | 0.12 | 0.2 | — | |
| sample 13 | 1.5 | 28.5 | 0 | 0.12 | 0.2 | — | |
| sample 14 | 1 | 29 | 0 | 0.12 | 0.15 | — | |
| sample 15 | 0.6 | 29.4 | 0 | 0.12 | 0.15 | — | |
| sample 16 | 5 | 20 | 5 | 0.12 | 0.2 | 0.3 | |
| sample 17 | 12.5 | 5 | 12.5 | 0.12 | 0.12 | 0.2 | |
| sample 18 | 5 | 20 | 5 | 0.12 | 0.2 | 0.3 | |
| sample 19 | 15 | 15 | 0 | 0.12 | 0.3 | — | |
| sample 20 | 15 | 15 | 0 | 0.12 | 0.5 | — | |
| sample 21 | 15 | 15 | 0 | 0.12 | 1 | — | |
| sample 22 | — | 30 | — | — | 0.2 | — | |
| sample 23 | 5 | 25 | 0 | 0.17 | 0.2 | — | |
| sample 24 | 5 | 25 | 0 | 0.02 | 0.2 | — | |
| sample 25 | 5 | 25 | 0 | 0.01 | 0.2 | — | |
| sample 26 | 0.2 | 29.8 | 0 | 0.12 | 0.2 | — | |
| sample 27 | 18 | 12 | 0 | 0.12 | 0.2 | — | |
| sample 28 | 15 | 15 | 0 | 0.12 | 1.7 | — | |

| | first layer porosity (%) | second layer porosity (%) | third layer porosity (%) | low porosity/high porosity | low porosity thickness ratio (%) | first layer material | second layer material | third layer material |
|---|---|---|---|---|---|---|---|---|
| sample 1 | 40 | 45 | — | 89 | 17 | PE | PE | — |
| sample 2 | 41 | 45 | — | 91 | 17 | PE | PE | — |
| sample 3 | 42 | 45 | — | 93 | 17 | PE | PE | — |
| sample 4 | 37 | 45 | — | 82 | 17 | PE | PE | — |
| sample 5 | 30 | 45 | — | 67 | 17 | PE | PE | — |
| sample 6 | 25 | 45 | — | 56 | 17 | PE | PE | — |
| sample 7 | 20 | 45 | — | 44 | 17 | PE | PE | — |
| sample 8 | 40 | 45 | — | 89 | 33 | PE | PE | — |
| sample 9 | 40 | 45 | — | 89 | 50 | PE | PE | — |
| sample 10 | 40 | 45 | — | 89 | 55 | PE | PE | — |
| sample 11 | 40 | 45 | — | 89 | 10 | PE | PE | — |
| sample 12 | 40 | 45 | — | 89 | 7 | PE | PE | — |
| sample 13 | 40 | 45 | — | 89 | 5 | PE | PE | — |
| sample 14 | 40 | 45 | — | 89 | 3.3 | PVdF | PE | — |
| sample 15 | 40 | 45 | — | 89 | 2 | PCdF | PE | — |
| sample 16 | 40 | 45 | 47 | 89 | 17 | PE | PE | PE |
| sample 17 | 45 | 40 | 45 | 89 | 17 | PE | PE | PE |
| sample 18 | 40 | 45 | 47 | 89 | 17 | PP | PE | PE |
| sample 19 | 40 | 47 | — | 85 | 50 | PE | PE | — |
| sample 20 | 40 | 55 | — | 73 | 50 | PE | PE | — |
| sample 21 | 40 | 60 | — | 67 | 50 | PE | PE | — |
| sample 22 | — | 45 | — | 100 | — | PE | PE | — |
| sample 23 | 43 | 45 | — | 96 | 17 | PE | PE | — |
| sample 24 | 17 | 45 | — | 38 | 17 | PE | PE | — |
| sample 25 | 13 | 45 | — | 29 | 17 | PE | PE | — |
| sample 26 | 40 | 45 | — | 89 | 1 | PVdF | PE | — |
| sample 27 | 40 | 45 | — | 89 | 60 | PE | PE | — |
| sample 28 | 40 | 65 | — | 62 | 50 | PE | PE | — |

TABLE 2

| | maximum temperature during overcharging (° C.) | 23° C. cell capacity (mAh) | −20° C. cell capacity (mAh) |
|---|---|---|---|
| sample 1 | 90 | 1601 | 599 |
| sample 2 | 93 | 1601 | 602 |
| sample 3 | 95 | 1600 | 601 |
| sample 4 | 86 | 1602 | 597 |
| sample 5 | 85 | 1599 | 590 |
| sample 6 | 72 | 1601 | 585 |
| sample 7 | 70 | 1600 | 579 |
| sample 8 | 85 | 1600 | 592 |
| sample 9 | 80 | 1601 | 590 |
| sample 10 | 77 | 1600 | 590 |
| sample 11 | 93 | 1602 | 600 |
| sample 12 | 95 | 1602 | 600 |
| sample 13 | 96 | 1602 | 602 |
| sample 14 | 99 | 1600 | 600 |
| sample 15 | 110 | 1600 | 602 |
| sample 16 | 85 | 1600 | 605 |
| sample 17 | 88 | 1601 | 601 |
| sample 18 | 82 | 1601 | 606 |
| sample 19 | 85 | 1601 | 610 |
| sample 20 | 92 | 1599 | 650 |
| sample 21 | 98 | 1601 | 701 |
| sample 22 | 115 | 1600 | 600 |
| sample 23 | 102 | 1602 | 600 |
| sample 24 | 87 | 1598 | 520 |
| sample 25 | 64 | 1600 | 382 |
| sample 26 | 114 | 1601 | 600 |
| sample 27 | 75 | 1600 | 501 |
| sample 28 | 116 | 1600 | 750 |

As may be seen from Table 2, comparison to sample 22 of the samples 1 to 7, with the samples 1 to 7 each employing a two-layered separator having micro-sized pores of different average pore diameters and also having different porosity values, reveals that the samples 1 to 7 manifest practically sufficient satisfactory values of both the maximum reached temperature in over-charging and the −20° C. cell capacity.

Conversely, with the sample 22 employing a single-layer separator, the value of the maximum reached temperature in over-charging is not optimum, even though the −20° C. cell capacity manifests a satisfactory value.

It may be seen from above that, by employing a two-layered separator having micro-sized pores of different average pore diameters and also having different values of the porosity, a non-aqueous electrolyte secondary cell may be obtained which is superior in both safety against over-charging and low temperature characteristics.

Moreover, comparison of the samples 1 to 7 and the samples 23 to 25 reveals that, with the use of a separator having two layers exhibiting different average pore diameters and different porosity values, the maximum reached temperature in over-charging and the −20° C. cell capacity manifest practically sufficient optimum values if, as with the samples 1 to 7, the porosity ratio between the one of the two layers which has the low porosity value (termed a low porosity layer) and the other layer which has the high porosity value (termed a high porosity layer) ranges between 44% and 93%.

It may also be seen that, with the samples 23 to 25 in which the values of the porosity ratio are 38%, 29% and 96%, one of the maximum reached temperature in over-charging and the −20° C. cell capacity falls short of a practically sufficient satisfactory value.

From the foregoing, it is seen that, with the use of the separator having two layers having micro-sized pores of different average pore diameters and different porosity values, both the maximum reached temperature in over-charging and the −20° C. cell capacity are of practically sufficient satisfactory values, that is both the high safety against overcharging and the low temperature characteristics can be reliably achieved, by setting the porosity value ratio to 44% to 93%. Thus, it may be said to be desirable that, with the use of the separator composed of two layers having different values of the average pore diameter and also having different values of the porosity, the porosity ratio between the low porosity layer and the high porosity layer is desirably in a range from 44% to 93%.

On the other hand, comparison of the samples 8 to 15, samples 26 and 27 reveals that, with the use of a separator made up by two layers having different average pore diameters and different porosity values, the maximum reached temperature in over-charging and the −20° C. cell capacity are of practically sufficient optimum values with the samples 8 to 15 in which the thickness of the low porosity layer accounts for 2 to 55% of the thickness of the entire separator.

Conversely, with the samples 26 and 27 in which the thickness of the low porosity layer accounts for 1 to 60% of the thickness of the entire separator, either the maximum reached temperature in over-charging or the −20° C. cell capacity falls short of the practically sufficient satisfactory value.

Thus, it may be seen that, with the use of the separator made up of two layers having different values of the average pore diameter and also having different porosity values, both the maximum reached temperature in over-charging and the −20° C. cell capacity are of practically sufficient satisfactory values, that is the high safety against over-charging and low temperature characteristics of the non-aqueous electrolyte secondary cell can be achieved in combination, by setting the thickness of the low porosity layer to a value ranging between 2% and 55% of the thickness of the entire separator.

Consequently, with the use of the separator having two layers of different average pore diameters and different porosity values, the thickness of the low porosity layer is desirably in a range from 2% to 55% of the thickness of the entire separator.

On the other hand, comparison of the samples 9, 19 to 21 and sample 28 reveals that, even with the use of a separator having two layers with different average pore diameters and different porosity values, the maximum reached temperature in over-charging and the −20° C. cell capacity are of practically sufficient optimum values, insofar as the samples 9 and 19 to 21 having the porosity of the high porosity layer in the range between 45% and 60% is concerned.

Conversely, with the sample 29 in which the porosity of the high porosity layer is 65%, the −20° C. cell capacity is of a practically sufficient satisfactory value, however, the maximum reached temperature in over-charging is not of a practically sufficient satisfactory value.

From the foregoing, it is seen that, even with the use of the separator having two layers with micro-sized pores of different average pore diameters and different porosity values, both the maximum reached temperature in over-charging and the −20° C. cell capacity are of practically sufficient satisfactory values, that is both the high safety against overcharging and the low temperature characteristics can be reliably achieved, by setting the porosity value of the high porosity layer to 45% to 60%. Thus, it may be said to be desirable that, with the use of the separator composed of two layers having different values of the average pore diameter and different values of the porosity, the porosity of the high porosity layer is desirably in a range from 45% to 60%.

Thus, with the use of the separator having two layers with micro-sized pores of different average pore diameters and different porosity values, the high porosity layer is desirably of the porosity ranging between 45% and 60%.

It may also be seen from the samples 16 and 18 that, even with the use of a separator having three layers with micro-sized pores of different average pore diameters and different porosity values, a non-aqueous electrolyte secondary cell superior in safety against over-charging and in low temperature characteristics can be produced, as in the case of the two-layered separator.

It may also be seen from the samples 14 and 15 that, with the use of a separator having two layers with micro-sized pores of different average pore diameters and different porosity values, a non-aqueous electrolyte secondary cell superior in safety against over-charging and in low temperature characteristics can be produced without regard to whether the high porosity layer and the low porosity layer are formed of the same material or of different materials.

It may likewise be seen from the samples 14 and 15 that, with the use of a separator having two layers with micro-sized pores of different average pore diameters and different porosity values, non-aqueous electrolyte secondary cells superior in safety against over-charging and in low temperature characteristics can be produced if the low porosity layer is formed by coating polyvinylidene fluoride on the high porosity layer and drying the resulting product in situ.

Second Aspect

First, the case of using, as a separator of a non-aqueous electrolyte secondary cell, a separator the micro-sized porous film of which located on the cathode side is of a material having a low melting point, is scrutinized.

Sample 30

First, an anode was prepared as follows: to 100 weight parts of petroleum coke, as a filler, 30 weight parts of coal tar pitch, as a binder, were added and mixed at approximately 100° C. The resulting mixture was compression molded in a press to form a precursor of a molded carbon mass.

This precursor was heat-treated at a temperature not higher than 1000° C. to form a molded carbon material, which then was impregnated with a binder pitch, melted at 200° C. or lower, and which was then heat-treated at a temperature not higher than 1000° C., by way of a so-called pitch impregnation/sintering process. This process was repeated several times.

This molded carbon mass was heat-treated at 2800° C. to produce graphized molded material which then was pulverized and classified to produce powder samples.

The so produced graphized powders were put to structural analyses by an X-ray diffractometry, from which it was found that the plane-to-plane spacing of the (002) plane was 0.337 nm, and that the C-axis crystallite thickness of the (002) plane was 50.0 nm. The true density as found by the picnometric method was 2.23 g/cm3. The specific surface area as found by the BET method was 1.6 m$^2$/g. As for the grain size distribution, as found by the laser diffraction method, the average grain size was 33.0 µm, the cumulative 10% grain size was 13.3 µm, cumulative 50% grain size was 30.6 µm and the cumulative 90% grain size was 55.7 µm. In addition, the average value of destruction strength of graphized particles was 7.1 kgf/mm2, while its bulk density was 0.98 g/cm3.

90 weight parts of the above sample powders and 10 weight parts of polyvinylidene fluoride (PVDF) as a binder were mixed together to prepare an anode mixture, which was then dispersed in N-methyl pyrrolidone as a solvent to form a slurry (paste).

This anode mixture slurry was coated on both sides of the anode current collector and dried. The resulting mass was compression-molded under a preset pressure to form a band-shaped anode. A band-shaped copper foil, 10 µm in thickness, was used as an anode current collector.

A cathode then was prepared. 0.5 mol of lithium carbonate and 1 mol of cobalt carbonate were mixed together. The resulting mixture was sintered in air for five hours at 880° C. The results of X-ray diffractometry, conducted on the so produced sintered material, indicated good coincidence with a peak of LiCoO$_2$ registered in the JCPDS file.

The so produced LiCoO$_2$ was pulverized to form powders with an average particle size of 8 µm. 95 weight parts of these LiCoO$_2$ powders and 5 weight parts of lithium carbonate were mixed together. 91 weight parts of this mixture, 6 weight parts of flaky graphite, as an electrically conductive material, and 3 weight parts of polyvinylidene fluoride, as a binder, were mixed together to form a cathode mixture, which then was dispersed in a slurry (paste).

The cathode mixture slurry was then coated on both surfaces of the cathode current collector and dried in situ. The resulting product was compression-molded under a constant pressure to form a band-shaped cathode. As the cathode current collector, a band-shaped aluminum foil 20 µm in thickness was used.

The band-shaped anode and the band-shaped cathode, prepared as described above, were layered in the order of the anode, separator, cathode, separator and so on, to form a spirally wound electrode unit having an outer diameter of 18 mm.

The separator, used here, was formed by two micro-porous films, layered together. Of these, the cathode side micro-porous film was a micro-porous polyethylene film of a melting point of 125° C., a thickness of 17 µm and a porosity of 36%. The anode side micro-porous film was a micro-porous polyethylene film of a melting point of 135° C., a thickness of 17 µm and a porosity of 36%. In the following explanation, the cathode side micro-porous film is counted as the first layer, and the anode side micro-porous films are counted as the second micro-porous film, a third micro-porous film and so on in the order that the films are progressively separated from the cathode.

Meanwhile, the melting point of the micro-porous film was measured by a differential scanning calorimeter (manufactured by Seiko Denshi Kogyo-Sha under the trade name of DSC220U), at a temperature raising rate of 5° C./min. The heat absorption peak temperature, as measured at this time, was used as melting temperature. On the other hand, the porosity of the micro-porous film was measured by a mercury pressing method, using a porosimeter (manufactured by Yuasa Ionics Co. Ltd., under the trade name of Poremaster).

The spirally wound electrode unit, obtained as described above, was housed in, a nickel-plated iron cell can. An insulating plate was arranged on each of the upper and lower surfaces of the spirally-shaped electrode unit. A cathode lead of aluminum was led out from the cathode current collector and welded to the cell lid, while a nickel anode lead was led out from the anode current collector and welded to the cell can.

In this cell can, a non-aqueous electrolyte, composed of LiPF6, ethylene carbonate and dimethyl carbonate at a weight mixing rate of LiPF6:ethylene carbonate:dimethyl carbonate of 10:40:50, was charged.

The cell can was caulked with an insulating sealing gasket, having its surface coated with asphalt, to secure a safety valve having a current breaking mechanism, a PTC device and a cell can to form a cylindrical non-aqueous electrolyte secondary cell with a diameter of 18 mm and a height of 65 mm, as the inside of the cell as kept air-tight as described above.

Sample 31

A non-aqueous electrolyte secondary cell was prepared in the same way as sample 30, except using, as a first micro-porous film, a film of a micro-porous polyethylene, having a melting point of 112° C., a thickness of 17 µm and a porosity of 36%, and also using, as a second micro-porous film, a film of micro-porous polyethylene, having a melting point of 135° C., a thickness of 17 µm and a porosity of 36%.

Sample 32

A non-aqueous electrolyte secondary cell was prepared in the same way as sample 30, except using, as a first micro-porous film, a film of a micro-porous polyethylene, having a melting point of 112° C., a thickness of 17 µm and a porosity of 36%, and also using, as a second micro-porous film, a film of micro-porous polyethylene, having a melting point of 165° C., a thickness of 17 µm and a porosity of 36%.

Sample 33

A non-aqueous electrolyte secondary cell was prepared in the same way as sample 30, except using, as a first micro-porous film, a film of a micro-porous polyethylene, having melting points of 125° C. and 130° C., a thickness of 17 µm and a porosity of 36%, and also using, as a second micro-porous film, a film of micro-porous polyethylene, having a melting point of 135° C., a thickness of 17 µm and a porosity of 36%.

Meanwhile, measurements of the melting point of the first micro-porous film indicated two heat absorption peaks at 125° C. and at 130° C.

Sample 34

A non-aqueous electrolyte secondary cell was prepared in the same way as sample 30, except using, as a first micro-porous film, a film of a micro-porous polyethylene, having melting points of 125° C. and 130° C., a thickness of 7 µm and a porosity of 36%, and also using, as a second micro-porous film, a film of micro-porous polyethylene, having a melting point of 140° C., a thickness of 27 μm and a porosity of 36%.

Sample 35

A non-aqueous electrolyte secondary cell was prepared in the same way as sample 30, except using, as a first micro-porous film, a film of a micro-porous polyethylene, having melting points of 125° C. and 130° C., a thickness of 7 μm and a porosity of 36%, and also using, as a second micro-porous film, a film of micro-porous polyethylene, having a melting point of 140° C., a thickness of 27 μm and a porosity of 36%.

Sample 36

A non-aqueous electrolyte secondary cell was prepared in the same way as sample 30, except using, as a first micro-porous film, a film of a micro-porous polyethylene, having melting points of 125° C. and 130° C., a thickness of 7 μm and a porosity of 36%, and also using, as a second micro-porous film, a film of micro-porous polyethylene, having a melting point of 165° C., a thickness of 27 μm and a porosity of 36%.

Sample 37

A non-aqueous electrolyte secondary cell was prepared in the same way as sample 30, except using, as a separator, a sole micro-porous film comprised of a film of micro-porous polyethylene having a melting point of 135° C., a thickness of 34 μm and a porosity of 36%.

Sample 38

A non-aqueous electrolyte secondary cell was prepared in the same way as sample 30, except using, as a separator, a sole micro-porous film comprised of a film of micro-porous polyethylene having a melting point of 125° C., a thickness of 34 μm and a porosity of 36%.

Sample 39

A non-aqueous electrolyte secondary cell was prepared in the same way as sample 30, except using, as a separator, a sole micro-porous film comprised of a film of micro-porous polyethylene having a melting point of 112° C., a thickness of 34 μm and a porosity of 36%.

Sample 40

A non-aqueous electrolyte secondary cell was prepared in the same way as sample 30, except using, as a first micro-porous film, a film of a micro-porous polyethylene, having a melting point of 135° C., a thickness of 17 μm and a porosity of 36%, and also using, as a second micro-porous film, a film of micro-porous polyethylene, having a melting point of 165° C., a thickness of 17 μm and a porosity of 36%.

Sample 41

A non-aqueous electrolyte secondary cell was prepared in the same way as sample 30, except using, as a first micro-porous film, a film of a micro-porous polyethylene, having a melting point of 135° C., a thickness of 17 μm and a porosity of 36%, and also using, as a second micro-porous film, a film of micro-porous polyethylene, having melting points of 125° C. and 130° C., a thickness of 17 μm and a porosity of 36%.

On the samples 30 to 41, prepared as described above, the fraction of inferiority was evaluated, while tests on overcharging and low temperature characteristics were conducted.

1. Inferiority Fraction 100 non-aqueous electrolyte secondary cells of respective samples were provided and put to constant current constant voltage tests under conditions of 23° C. atmosphere, an upper limit voltage of 4.2 V, a current of 0.3 A and the test time of 10 hours. After charging, the cells were stored for one month in a 23° C. atmosphere. These cells were put to OCV measurement and the cells lower than 4.15 V were retained as rejects.

2. Overcharging Test

A thermocouple was bonded to the surface of the non-aqueous electrolyte secondary cell of each sample. In this state, constant current constant voltage charging was carried out in a 23° C. atmosphere, an upper limit temperature of 18V, a current of 1.5 A and a charging time of four hours to measure the maximum temperature.

3. Test on Low Temperature Characteristics

The non-aqueous electrolyte secondary cells of the respective samples were put to constant current constant voltage charging, in a 23° C. constant temperature vessel, under the conditions of the upper limit voltage of 4.2V, current of 1 A and the charting time of three hours. After the end of the charging, constant current discharging at 0.8 A was carried out up to a terminal voltage of 3.0 V.

The constant current constant voltage charging was carried out for three hours at an upper limit voltage of 4.2 V, the current of 1 A and the charging time duration of three hours.

The test cells were allowed to stand for three hours in a constant temperature vessel, maintained at −20° C. The test cells were put to constant current discharging at 0.7 A in the constant temperature vessel maintained at −20° C., up to the terminal voltage of 3.0 V. The cell capacity at this time was measured.

The results of the above test are shown in the following Table 3, in which polyethylene and polypropylene are indicated as PE and PP, respectively.

TABLE 3

|  | melting point (° C.) | | | thickness (μm) | | | first layer thickness/total thickness (%) |
|---|---|---|---|---|---|---|---|
|  | (cathode side) | (anode side) | | (positive side) | (anode side) | | |
|  | first layer | second layer | third layer | first layer | second layer | third layer | |
| sample 30 | 125 | 135 | — | 17 | 17 | — | 50 |
| sample 31 | 112 | 135 | — | 17 | 17 | — | 50 |
| sample 32 | 112 | 165 | — | 17 | 17 | — | 50 |
| sample 33 | 125, 130 | 135 | — | 17 | 17 | — | 50 |
| sample 34 | 125, 130 | 140 | — | 7 | 27 | — | 20.6 |
| sample 35 | 125, 130 | 145 | — | 7 | 27 | — | 20.6 |
| sample 36 | 125, 130 | 165 | — | 7 | 27 | — | 20.6 |
| sample 37 | 135 | — | — | 34 | — | — | 100 |
| sample 38 | 125 | — | — | 34 | — | — | 100 |
| sample 39 | 112 | — | — | 34 | — | — | 100 |
| sample 40 | 135 | 125 | — | 17 | 17 | — | 50 |
| sample 41 | 135 | 125, 130 | — | 17 | 17 | — | 50 |

TABLE 3-continued

| | porosity (%) | | | material | | | inferiority fraction (in 100 items) | maximum temperature on overcharging | −20° C. cell capacity (mAh) |
|---|---|---|---|---|---|---|---|---|---|
| | (cathode side) first layer | (anode side) second layer | third layer | (cathode side) first layer | (anode side) second layer | third layer | | | |
| sample 30 | 36 | 36 | — | pe | pe | — | 3 | 86 | 499 |
| sample 31 | 36 | 36 | — | pe | pe | — | 5 | 70 | 499 |
| sample 32 | 36 | 36 | — | pe | pp | — | 1 | 72 | 500 |
| sample 33 | 36 | 36 | — | pe | pe | — | 1 | 89 | 500 |
| sample 34 | 36 | 36 | — | pe | pe | — | 1 | 91 | 499 |
| sample 35 | 36 | 36 | — | pe | pe | — | 1 | 93 | 500 |
| sample 36 | 36 | 36 | — | pe | pp | — | 0 | 97 | 504 |
| sample 37 | 36 | — | — | pe | — | — | 1 | 105 | 500 |
| sample 38 | 36 | — | — | pe | — | — | 11 | 80 | 500 |
| sample 39 | 36 | — | — | pe | — | — | 35 | 64 | 500 |
| sample 40 | 36 | 36 | — | pe | pe | — | 4 | 98 | 500 |
| sample 41 | 36 | 36 | — | pe | pe | — | 2 | 100 | 501 |

As may be seen from Table 3, the samples 30 to 32, in which the separator is formed by two layers of the micro-porous films and in which the cathode side micro-porous film has a relatively low melting point, are lower in the inferiority fraction and in the maximum temperature in overcharging than the samples 37 to 39 in which the separator is formed by a single layer micro-porous film.

Moreover, the sample 30, in which the separator is formed by two layers of the micro-porous films and the cathode side micro-porous film is relatively low in melting point, shows a lower inferiority fraction and a lower maximum temperature in overcharging than the sample 40 the cathode side micro-porous film of which is of a relatively high melting point.

From the above results, it is seen that the non-aqueous electrolyte secondary cell, in which the separator is formed by two layers of the micro-porous films and in which the cathode side micro-porous film is of a relatively low melting point, is superior in productivity, while making it possible to suppress temperature rise otherwise caused at the time of overcharging.

From the results of the samples 33 and 36, if the cathode side micro-porous film has two melting points, the low inferiority fraction and the temperature rise suppressing effect at the time of overcharging can be achieved in combination more reliably.

Experiment 3

The desirable thickness of the cathode side micro-porous film, with respect to the total separator thickness, was then scrutinized.

Sample 42

A non-aqueous electrolyte secondary cell was prepared in the same way as in sample 30, except using, as a first layer micro-porous film, a film of micro-porous polyethylene, with melting points of 125° and 135° C., a thickness of 4 μm and a porosity of 36%, and also using, as a second layer micro-porous film, a film of micro-porous polyethylene, with the melting point of 135° C., a thickness of 30 μm and a porosity of 36%. Meanwhile, the thickness of the cathode side micro-porous film with respect to the total separator thickness was 11.8%.

Sample 43

A non-aqueous electrolyte secondary cell was prepared in the same way as in sample 30, except using, as a first layer micro-porous film, a film of micro-porous polyethylene, with melting points of 125° and 135° C., a thickness of 7 μm and a porosity of 36%, and also using, as a second layer micro-porous film, a film of micro-porous polyethylene, with the melting point of 135° C., a thickness of 27 μm and a porosity of 36%. Meanwhile, the thickness of the cathode side micro-porous film with respect to the total separator thickness was 20.6%.

Sample 44

A non-aqueous electrolyte secondary cell was prepared in the same way as in sample 30, except using, as a first layer micro-porous film, a film of micro-porous polyethylene, with melting points of 125° and 135° C., a thickness of 9 μm and a porosity of 36%, and also using, as a second layer micro-porous film, a film of micro-porous polyethylene, with the melting point of 135° C., a thickness of 25 μm and a porosity of 36%. Meanwhile, the thickness of the cathode side micro-porous film with respect to the total separator thickness was 26.5%.

Sample 45

A non-aqueous electrolyte secondary cell was prepared in the same way as in sample 30, except using, as a first layer micro-porous film, a film of micro-porous polyethylene, with melting points of 125° and 135° C., a thickness of 11 μm and a porosity of 36%, and also using, as a second layer micro-porous film, a film of micro-porous polyethylene, with the melting point of 135° C., a thickness of 23 μm and a porosity of 36%. Meanwhile, the thickness of the cathode side micro-porous film with respect to the total separator thickness was 32.4%.

Sample 46

A non-aqueous electrolyte secondary cell was prepared in the same way as in sample 30, except using, as a first layer micro-porous film, a film of micro-porous polyethylene, with melting points of 125° and 135° C., a thickness of 20 μm and a porosity of 36%, and also using, as a second layer micro-porous film, a film of micro-porous polyethylene, with the melting point of 135° C., a thickness of 14 μm and a porosity of 36%. Meanwhile, the thickness of the cathode side micro-porous film with respect to the total separator thickness was 58.8%.

Sample 47

A non-aqueous electrolyte secondary cell was prepared in the same way as in sample 30, except using, as a first layer micro-porous film, a film of micro-porous polyethylene, with melting points of 125° and 135° C., a thickness of 25 μm and a porosity of 36%, and also using, as a second layer micro-porous film, a film of micro-porous polyethylene, with the melting point of 135° C., a thickness of 9 μm and a porosity of 36%. Meanwhile, the thickness of the cathode side micro-porous film with respect to the total separator thickness was 73.5%.

Sample 48

A non-aqueous electrolyte secondary cell was prepared in the same way as in sample 30, except using, as a first layer micro-porous film, a film of micro-porous polyethylene, with melting points of 125° and 135° C., a thickness of 29 μm and a porosity of 36%, and also using, as a second layer micro-porous film, a film of micro-porous polyethylene, with the melting point of 135° C., a thickness of 5 μm and a porosity of 36%. Meanwhile, the thickness of the cathode side micro-porous film with respect to the total separator thickness was 85.3%.

Sample 49

A non-aqueous electrolyte secondary cell was prepared in the same way as in sample 30, except using, as a first layer micro-porous film, a film of micro-porous polyethylene, with melting points of 125° and 135° C., a thickness of 31 μm and a porosity of 36%, and also using, as a second layer micro-porous film, a film of micro-porous polyethylene, with the melting point of 135° C., a thickness of 3 μm and a porosity of 36%. Meanwhile, the thickness of the cathode side micro-porous film with respect to the total separator thickness was 91.2%.

For the samples 42 to 49, prepared as described above, evaluation of the inferiority fraction and tests on over-charging and low temperature characteristics were conducted in the same way as in the above-described experiment 2. The results are shown in the following Table 4.

As may be seen from Table 4, the samples 43 to 48 exhibited a low fraction of inferiority and a lower value of the maximum temperature at the time of over-charging.

Conversely, with the sample 42, in which the thickness of the cathode side micro-porous film accounts for 11.8% of the total separator thickness, the effect in suppressing temperature rise at the time of over-charging is insufficient because of the low proportion of the side cathode micro-porous film of the low melting point. On the other hand, with the sample 49 in which the thickness of the cathode side micro-porous film accounts for 91.2% of the total separator thickness, the inferiority fraction is that high because of the worsened separator strength.

As may be seen from the results of the above Experiment 3, the thickness of the side cathode micro-porous film is preferably in a range from 20% to 85% based on the total separator thickness.

Experiment 4

The desirable range of the melting point of the side cathode micro-porous film forming the separator was then scrutinized.

Sample 50

A non-aqueous electrolyte secondary cell was prepared in the same way as in sample 30, except using, as a first layer micro-porous film, a film of micro-porous polyethylene, with melting points of 125° and 135° C., a thickness of 7 μm and a porosity of 36%, and also using, as a second layer micro-porous film, a film of micro-porous polyethylene, with the melting point of 135° C., a thickness of 27 μm and a porosity of 36%.

Sample 51

A non-aqueous electrolyte secondary cell was prepared in the same way as in sample 30, except using, as a first layer

TABLE 4

| | melting point (° C.) | | | material | | | first layer thickness/total thickness |
|---|---|---|---|---|---|---|---|
| | (cathode side) first layer | (anode side) second layer | third layer | (cathode side) first layer | (anode side) second layer | third layer | |
| sample 42 | 125, 130 | 135 | — | 4 | 30 | — | 11.8 |
| sample 43 | 125, 130 | 135 | — | 7 | 27 | — | 20.6 |
| sample 44 | 125, 130 | 135 | — | 9 | 25 | — | 26.5 |
| sample 45 | 125, 130 | 135 | — | 11 | 23 | — | 32.4 |
| sample 46 | 125, 130 | 135 | — | 20 | 14 | — | 58.8 |
| sample 47 | 125, 130 | 135 | — | 25 | 9 | — | 73.5 |
| sample 48 | 125, 130 | 135 | — | 29 | 5 | — | 85.3 |
| sample 49 | 125, 130 | 135 | — | 31 | 3 | — | 91.2 |

| | porosity (%) | | | material | | | inferiority fraction (in 100 items) | maximum temperature during overcharging (° C.) | −20° C. cell capacity (mAh) |
|---|---|---|---|---|---|---|---|---|---|
| | (cathode side) first layer | (anode side) second layer | third layer | (cathode side) first layer | (anode side) second layer | third layer | | | |
| sample 42 | 36 | 36 | — | pe | pe | — | 1 | 100 | 499 |
| sample 43 | 36 | 36 | — | pe | pe | — | 1 | 97 | 500 |
| sample 44 | 36 | 36 | — | pe | pe | — | 1 | 95 | 497 |
| sample 45 | 36 | 36 | — | pe | pe | — | 1 | 93 | 498 |
| sample 46 | 36 | 36 | — | pe | pe | — | 2 | 88 | 501 |
| sample 47 | 36 | 36 | — | pe | pe | — | 3 | 85 | 503 |
| sample 48 | 36 | 36 | — | pe | pe | — | 5 | 84 | 504 |
| sample 49 | 36 | 36 | — | pe | pe | — | 6 | 82 | 497 | micro-porous film, a film of micro-porous polyethylene, with melting points of 122° and 130° C., a thickness of 7 μm and a porosity of 36%, and also using, as a second layer micro-porous film, a film of micro-porous polyethylene, with the melting point of 135° C., a thickness of 27 μm and a porosity of 36%.

Sample 52

A non-aqueous electrolyte secondary cell was prepared in the same way as in sample 30, except using, as a first layer micro-porous film, a film of micro-porous polyethylene, with melting points of 120° and 130° C., a thickness of 7 μm and a porosity of 36%, and also using, as a second layer micro-porous film, a film of micro-porous polyethylene, with the melting point of 135° C., a thickness of 27 μm and a porosity of 36%.

Sample 53

A non-aqueous electrolyte secondary cell was prepared in the same way as in sample 30, except using, as a first layer micro-porous film, a film of micro-porous polyethylene, with melting points of 112° and 130° C., a thickness of 7 μm and a porosity of 36%, and also using, as a second layer micro-porous film, a film of micro-porous polyethylene, with the melting point of 135° C., a thickness of 27 μm and a porosity of 36%.

Sample 54

A non-aqueous electrolyte secondary cell was prepared in the same way as in sample 30, except using, as a first layer micro-porous film, a film of micro-porous polyethylene, with melting points of 125° and 130° C., a thickness of 7 μm and a porosity of 36%, and also using, as a second layer micro-porous film, a film of micro-porous polyethylene, with the melting point of 135° C., a thickness of 27 μm and a porosity of 36%.

Sample 55

A non-aqueous electrolyte secondary cell was prepared in the same way as in sample 30, except using, as a first layer micro-porous film, a film of micro-porous polyethylene, with melting points of 125° and 133° C., a thickness of 7 μm and a porosity of 36%, and also using, as a second layer micro-porous film, a film of micro-porous polyethylene, with the melting point of 135° C., a thickness of 27 μm and a porosity of 36%.

Sample 56

A non-aqueous electrolyte secondary cell was prepared in the same way as in sample 30, except using, as a first layer micro-porous film, a film of micro-porous polyethylene, with melting points of 108° and 130° C., a thickness of 7 μm and a porosity of 36%, and also using, as a second layer micro-porous film, a film of micro-porous polyethylene, with the melting point of 135° C., a thickness of 27 μm and a porosity of 36%.

For the samples 50 to 56, prepared as described above, the inferiority fraction was evaluated, and tests on overcharging and low temperature characteristics were carried out, as in the above experiment 2. The results are shown in the following Table 5.

TABLE 5

| | melting point (° C.) | | | thickness (μm) | | | first layer thickness/total thickness (%) |
|---|---|---|---|---|---|---|---|
| | (cathode side) first layer | (anode side) second layer | third layer | (cathode side) first layer | (anode side) second layer | third layer | |
| sample 50 | 125, 130 | 135 | — | 7 | 27 | — | 20.6 |
| sample 51 | 122, 130 | 135 | — | 7 | 27 | — | 20.6 |
| sample 52 | 120, 130 | 135 | — | 7 | 27 | — | 20.6 |
| sample 53 | 112, 130 | 135 | — | 7 | 27 | — | 20.6 |
| sample 54 | 125, 130 | 135 | — | 7 | 27 | — | 20.6 |
| sample 55 | 125, 133 | 135 | — | 7 | 27 | — | 20.6 |
| sample 56 | 108, 130 | 135 | — | 7 | 27 | — | 20.6 |

| | porosity (%) | | | material | | | inferiority fraction (in 100 items) | maximum temperature during overcharging | −20° C. cell capacity (mAh) |
|---|---|---|---|---|---|---|---|---|---|
| | (cathode side) first layer | (anode side) second layer | third layer | (cathode side) first layer | (anode side) second layer | third layer | | | |
| sample 50 | 36 | 36 | — | PE | PE | PE | 1 | 85 | 501 |
| sample 51 | 36 | 36 | — | PE | PE | PE | 2 | 80 | 500 |
| sample 52 | 36 | 36 | — | PE | PE | — | 3 | 77 | 502 |
| sample 53 | 36 | 36 | — | PE | PE | — | 7 | 70 | 499 |
| sample 54 | 36 | 36 | — | PE | PE | — | 1 | 90 | 500 |
| sample 55 | 36 | 36 | — | PE | PE | — | 0 | 92 | 500 |
| sample 56 | 36 | 36 | — | PE | PE | — | 20 | 66 | 498 |

As may be seen from Table 5, the samples 50 to 55 showed a low inferiority fraction and lower values of the maximum temperature in overcharging. Conversely, the sample 56, in which the melting points of the first layer micro-porous film are 108° C. and 130° C., showed only poor strength because of the lower melting point of the first layer micro-porous film, accounting for an increased inferiority fraction caused.

As may be seen from the results of the experiment 4, the melting point of the side cathode micro-porous film is desirably not lower than 112° C. and not higher than 133° C.

Experiment 5

The desirable value of the porosity of the separator was then investigated.

Sample 57

A non-aqueous electrolyte secondary cell was prepared in the same way as in sample 30, except using, as a first layer micro-porous film, a film of micro-porous polyethylene, with melting points of 125° and 130° C., a thickness of 17 μm and a porosity of 20%, and also using, as a second layer micro-porous film, a film of micro-porous polyethylene, with the melting point of 135° C., a thickness of 17 μm and a porosity of 20%.

Sample 58

A non-aqueous electrolyte secondary cell was prepared in the same way as in sample 30, except using, as a first layer micro-porous film, a film of micro-porous polyethylene, with melting points of 125° and 130° C., a thickness of 17 μm and a porosity of 25%, and also using, as a second layer micro-porous film, a film of micro-porous polyethylene, with the melting point of 135° C., a thickness of 17 μm and a porosity of 25%.

Sample 59

A non-aqueous electrolyte secondary cell was prepared in the same way as in sample 30, except using, as a first layer micro-porous film, a film of micro-porous polyethylene, with melting points of 125° and 130° C., a thickness of 17 μm and a porosity of 30%, and also using, as a second layer micro-porous film, a film of micro-porous polyethylene, with the melting point of 135° C., a thickness of 17 μm and a porosity of 30%.

Sample 60

A non-aqueous electrolyte secondary cell was prepared in the same way as in sample 30, except using, as a first layer micro-porous film, a film of micro-porous polyethylene, with melting points of 125° and 130° C., a thickness of 17 μm and a porosity of 40%, and also using, as a second layer micro-porous film, a film of micro-porous polyethylene, with the melting point of 135° C., a thickness of 17 μm and a porosity of 40%.

Sample 61

A non-aqueous electrolyte secondary cell was prepared in the same way as in sample 30, except using, as a first layer micro-porous film, a film of micro-porous polyethylene, with melting points of 125° and 130° C., a thickness of 17 μm and a porosity of 45%, and also using, as a second layer micro-porous film, a film of micro-porous polyethylene, with the melting point of 135° C., a thickness of 17 μm and a porosity of 45%.

Sample 62

A non-aqueous electrolyte secondary cell was prepared in the same way as in sample 30, except using, as a first layer micro-porous film, a film of micro-porous polyethylene, with melting points of 125° and 130° C., a thickness of 17 μm and a porosity of 50%, and also using, as a second layer micro-porous film, a film of micro-porous polyethylene, with the melting point of 135° C., a thickness of 17 μm and a porosity of 50%.

Sample 63

A non-aqueous electrolyte secondary cell was prepared in the same way as in sample 30, except using, as a first layer micro-porous film, a film of micro-porous polyethylene, with melting points of 125° and 130° C., a thickness of 17 μm and a porosity of 55%, and also using, as a second layer micro-porous film, a film of micro-porous polyethylene, with the melting point of 135° C., a thickness of 17 μm and a porosity of 55%.

For the samples 57 to 63, prepared as described above, the inferiority fraction was evaluated, and tests on over-charging and low temperature characteristics were carried out. The results are shown in the following Table 6.

TABLE 6

| | porosity (%) | | | thickness (μm) | | | first layer thickness/total thickness |
|---|---|---|---|---|---|---|---|
| | (cathode side) first layer | (anode side) | | (cathode side) first layer | (anode side) | | |
| | | second layer | third layer | | second layer | third layer | |
| sample 57 | 125.130 | 135 | — | 17 | 17 | — | 50 |
| sample 58 | 125.130 | 135 | — | 17 | 17 | — | 50 |
| sample 59 | 125.130 | 135 | — | 17 | 17 | — | 50 |
| sample 60 | 125.130 | 135 | — | 17 | 17 | — | 50 |
| sample 61 | 125.130 | 135 | — | 17 | 17 | — | 50 |
| sample 62 | 125.130 | 135 | — | 17 | 17 | — | 50 |
| sample 63 | 125.130 | 135 | — | 17 | 17 | — | 50 |

| | porosity (%) | | | material | | | inferiority fraction (in 100 items) | maximum temperature on overcharging (° C.) | −20° C. cell capacity (mAh) |
|---|---|---|---|---|---|---|---|---|---|
| | (cathode side) first layer | (anode side) | | (cathode side) first layer | (anode side) | | | | |
| | | second layer | third layer | | second layer | third layer | | | |
| sample 57 | 20 | 20 | — | pe | pe | — | 0 | 85 | 449 |
| sample 58 | 25 | 25 | — | pe | pe | — | 0 | 87 | 485 |
| sample 59 | 30 | 30 | — | pe | pe | — | 0 | 89 | 490 |
| sample 60 | 40 | 40 | — | pe | pe | — | 2 | 92 | 515 |
| sample 61 | 45 | 45 | — | pe | pe | — | 3 | 93 | 520 |
| sample 62 | 50 | 50 | — | pe | pe | — | 5 | 95 | 525 |
| sample 63 | 55 | 55 | — | pe | pe | — | 11 | 100 | 552 |

As may be seen from Table 6, the samples 58 to 62 showed only low fraction of inferiority, lower values of the maximum temperature in overcharging, and optimum values of the low temperature characteristics. Conversely, with the sample 57, with the separator porosity value of 20%, migration of lithium ions was obstructed and low temperature characteristics were impaired due to the lower porosity. On the other hand, with the sample 63, with the separator porosity being as high as 55%, the probability is high for particles of the active material to be intruded into separator pores, accounting for the high fraction of inferiority.

As may be seen from the above results of the experiment 5, the separator desirably has a porosity in a range not lower than 25% and not higher than 50%.

Experiment 6

The case of the micro-porous film having plural melting points was then investigated.

Sample 64

A non-aqueous electrolyte secondary cell was prepared in the same way as in sample 30, except using, as a first layer micro-porous film, a film of micro-porous polyethylene, with melting points of 125° and 130° C., a thickness of 17 μm and a porosity of 36%, and using, as a second layer micro-porous film, a film of micro-porous polyethylene, with the melting point of 132° C., a thickness of 10 μm and a porosity of 36%, while also using, as a third layer micro-porous film, a film of micro-porous polyethylene, with the melting point of 135° C., a thickness of 7 μm and a porosity of 36%.

Sample 65

A non-aqueous electrolyte secondary cell was prepared in the same way as in sample 30, except using, as a first layer micro-porous film, a film of micro-porous polyethylene, with melting points of 125° and 130° C., a thickness of 17 μm and a porosity of 36%, and using, as a second layer micro-porous film, a film of micro-porous polyethylene, with the melting point of 135° C., a thickness of 10 μm and a porosity of 36%, while also using, as a third layer micro-porous film, a film of micro-porous polyethylene, with the melting point of 132° C., a thickness of 7 μm and a porosity of 36%.

Sample 66

A non-aqueous electrolyte secondary cell was prepared in the same way as in sample 30, except using, as a first layer micro-porous film, a film of micro-porous polyethylene, with the melting point of 125°, a thickness of 17 μm and a porosity of 36%, and also using, as a second layer micro-porous film, a film of micro-porous polyethylene, with melting points of 135° C. and 140° C., a thickness of 17 μm and a porosity of 36%.

Sample 67

A non-aqueous electrolyte secondary cell was prepared in the same way as in sample 30, except using, as a first layer micro-porous film, a film of micro-porous polyethylene, with melting points of 125° and 130° C., a thickness of 17 μm and a porosity of 36%, and also using, as a second layer micro-porous film, a film of micro-porous polyethylene, with the melting points of 135° C. and 140° C., a thickness of 17 μm and a porosity of 36%.

Sample 68

A non-aqueous electrolyte secondary cell was prepared in the same way as in sample 30, except using, as a first layer micro-porous film, a film of micro-porous polyethylene, with melting points of 120° C., 125° and 130° C., a thickness of 17 μm and a porosity of 36%, and also using, as a second layer micro-porous film, a film of micro-porous polyethylene, with the melting point of 135° C., a thickness of 17 μm and a porosity of 36%.

For the samples 64 to 68, prepared as described above, the inferiority fraction was evaluated, and tests on over-charging and low temperature characteristics were carried out, as in Experiment 2 described above. The results are shown in the following Table 5. The results are shown in the following Table 7.

TABLE 7

| | melting point (° C.) | | | thickness (μm) | | | first layer thickness/total thickness (%) |
|---|---|---|---|---|---|---|---|
| | (cathode side) first layer | (anode side) second layer | third layer | (cathode side) first layer | (anode side) second layer | third layer | |
| sample 64 | 125, 130 | 132 | 135 | 17 | 10 | 7 | 50 |
| sample 65 | 125, 130 | 135 | 132 | 17 | 10 | 7 | 50 |
| sample 66 | 125 | 135, 140 | — | 17 | 17 | — | 50 |
| sample 67 | 125.130 | 135, 140 | — | 17 | 17 | — | 50 |
| sample 68 | 120, 125, 130 | 135 | — | 17 | 17 | — | 50 |

| | porosity (%) | | | material | | | inferiority fraction (in 100 items) | maximum temperature during overcharging | −20° C. cell capacity (mAh) |
|---|---|---|---|---|---|---|---|---|---|
| | (cathode side) first layer | (anode side) second layer | third layer | (cathode side) first layer | (anode side) second layer | third layer | | | |
| sample 64 | 36 | 36 | 36 | PE | PE | PE | 1 | 82 | 500 |
| sample 65 | 36 | 36 | 36 | PE | PE | PE | 2 | 85 | 499 |
| sample 66 | 36 | 36 | — | PE | PE | — | 0 | 91 | 501 |
| sample 67 | 36 | 36 | — | PE | PE | — | 0 | 95 | 502 |
| sample 68 | 36 | 36 | — | PE | PE | — | 0 | 84 | 500 |

As may be seen from Table 7, even when the separator is made up by three layers of the micro-porous films, the samples 64 and 65, in each of which the micro-porous film with the lowest melting point is mounted proximate to the cathode, show a low fraction of inferiority, and a lower value of the maximum temperature in over-charging.

Moreover, as may be seen from the results for the samples 66 to 68, satisfactory test results are obtained when, in case the separator is made up by three layers of the micro-porous films, the second micro-porous film has two melting points, each of two micro-porous films has two melting points, or one of the micro-porous films has three melting points, provided that the micro-porous film with the lowest melting point is mounted proximate to the cathode.

What is claimed is:

1. A non-aqueous electrolyte secondary cell comprising:
   a cathode comprising a lithium-containing cathode active material;
   an anode comprising an anode active material capable of doping and undoping lithium;
   a non-aqueous electrolyte; and
   a separator comprising a plurality of layers of a microporous polyolefine material, wherein,
      at least two microporous polyolefine material layers have different porosity values and include a highest porosity layer proximate to the anode and a lowest porosity layer proximate to the cathode during discharge of the cell,
      the highest porosity layer has an average pore diameter of 0.1 µm to 1.0 µm and a porosity value B of 45%,
      the lowest porosity layer has a thickness of 2% to 55% of the separator thickness, an average pore diameter of 0.03 µm to 0.2 µm, and a porosity value A of 25%
      a porosity ratio A/B is 44% to 93%, and
      at least one microporous material layer is of a resin coating material on one of the plurality of layers that has dried in situ.

2. The non-aqueous electrolyte secondary cell of claim 1, wherein the porosity ratio A/B is 56% to 93%.

3. The non-aqueous electrolyte secondary cell of claim 1, wherein the lowest porosity layer and the highest porosity layer are of different materials.

4. The non-aqueous electrolyte secondary cell of claim 1, wherein the lowest porosity layer has a shutdown effect.

5. A non-aqueous electrolyte secondary cell comprising:
   a cathode comprising a lithium-containing cathode active material;
   an anode comprising an anode active material capable of doping and undoping lithium;
   a non-aqueous electrolyte; and
   a separator comprising a plurality of layers of a microporous polyolefine material, wherein,
      at least two microporous polyolefine material layers have different porosity values and include a highest porosity layer proximate to the anode and a lowest porosity layer proximate to the cathode during discharge of the cell,
      the highest porosity layer has an average pore diameter of 0.1 µm to 1.0 µm and a porosity value B of 45%,
      the lowest porosity layer has a shutdown effect and has a thickness of 2% to 55% of the separator thickness, an average pore diameter of 0.03 µm to 0.2 µm, and a porosity value A of 25%, and
      a porosity ratio A/B is 44% to 93%.

6. The non-aqueous electrolyte secondary cell of claim 5 wherein the lowest porosity layer and the highest porosity layer are of the same material.

7. The non-aqueous electrolyte secondary cell of claim 5 wherein the lowest porosity layer and the highest porosity layer are of different materials.

* * * * *